(12) United States Patent
Hirsch et al.

(10) Patent No.: US 8,249,031 B1
(45) Date of Patent: Aug. 21, 2012

(54) AGGREGATION COEXISTENCE MECHANISM FOR WIRELESS DEVICES

(75) Inventors: Olaf Hirsch, Sunnyvale, CA (US); Prerepa Viswanadham, San Jose, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 271 days.

(21) Appl. No.: 12/620,270

(22) Filed: Nov. 17, 2009

(51) Int. Cl.
*H04J 3/00* (2006.01)

(52) U.S. Cl. ........................................................ 370/336

(58) Field of Classification Search .................. None
See application file for complete search history.

(56) References Cited

U.S. PATENT DOCUMENTS

| | | | |
|---|---|---|---|
| 7,046,649 B2 | 5/2006 | Awater et al. | |
| 7,151,764 B1 | 12/2006 | Heinonen et al. | |
| 7,460,543 B2* | 12/2008 | Malik et al. | 370/395.4 |
| 7,568,034 B1* | 7/2009 | Dulitz et al. | 709/226 |
| 7,814,224 B2* | 10/2010 | Maruyama et al. | 709/235 |
| 2002/0136233 A1 | 9/2002 | Chen et al. | |
| 2004/0156367 A1* | 8/2004 | Albuquerque et al. | 370/395.4 |
| 2004/0242258 A1 | 12/2004 | Kim | |
| 2005/0185651 A1* | 8/2005 | Rinne | 370/395.1 |
| 2006/0030266 A1 | 2/2006 | Desai et al. | |
| 2006/0221825 A1 | 10/2006 | Okano | |
| 2006/0292986 A1 | 12/2006 | Bitran et al. | |
| 2007/0021066 A1 | 1/2007 | Dravida et al. | |
| 2007/0135162 A1 | 6/2007 | Banerjea et al. | |
| 2007/0165754 A1 | 7/2007 | Kiukkonen et al. | |
| 2007/0183338 A1 | 8/2007 | Singh et al. | |
| 2007/0275746 A1 | 11/2007 | Bitran | |
| 2008/0095124 A1* | 4/2008 | Ramos et al. | 370/336 |
| 2008/0102885 A1 | 5/2008 | Tu et al. | |
| 2008/0123682 A1* | 5/2008 | Yackoski et al. | 370/443 |
| 2008/0130603 A1 | 6/2008 | Wentink et al. | |
| 2008/0240139 A1* | 10/2008 | Kodialam et al. | 370/412 |
| 2008/0259846 A1 | 10/2008 | Gonikberg et al. | |
| 2009/0010152 A1* | 1/2009 | Ofek et al. | 370/216 |
| 2009/0137206 A1 | 5/2009 | Sherman et al. | |
| 2009/0247217 A1 | 10/2009 | Hsu et al. | |
| 2009/0252095 A1 | 10/2009 | Lu et al. | |
| 2009/0258607 A1 | 10/2009 | Beninghaus et al. | |
| 2009/0298522 A1 | 12/2009 | Chaudhri et al. | |
| 2010/0284380 A1 | 11/2010 | Banerjee et al. | |
| 2011/0009060 A1 | 1/2011 | Hsu et al. | |
| 2011/0268024 A1 | 11/2011 | Jamp et al. | |

OTHER PUBLICATIONS

"US Appl. No. 12/236,604 Office Action", Jun. 29, 2011, 39 pages.
Bluetooth, , "Bluetooth Core Specification Version 3.0", vol. 2, part B: *Core System Package [Controller volume]*http://www.bluetooth.com/Bluetooth/Technology/Building/Specifications/ (Obtained from the Internet Nov. 4, 2009) Apr. 21, 2009, pp. 59-206.
U.S. Appl. No. 12/846,427, filed Jul. 29, 2010, Jamp, Joe I.

(Continued)

*Primary Examiner* — Robert Scheibel
*Assistant Examiner* — Prenell Jones
(74) *Attorney, Agent, or Firm* — DeLizio Gilliam, PLLC

(57) ABSTRACT

Wireless radio devices that communicate in close proximity to each other typically suffer from interference. Such interference between the wireless radio devices can result in performance degradation in either/both the wireless radio devices. Functionality can be implemented to schedule communications of one wireless radio device around communications of the other wireless radio device based on a coexistence table comprising scheduling information of the other wireless radio device. Communications of the wireless radio devices can also be controlled based on communication priorities. Functionality can also be implemented to dynamically control a number of packets transmitted in an aggregate based on the scheduling information.

25 Claims, 10 Drawing Sheets

OTHER PUBLICATIONS

U.S. Appl. No. 12/651,871, filed Jan. 4, 2010, Husted, Paul J.
"PCT Application No. PCT/US11/45888 International Search Report", Dec. 13, 2011, 7 pages.
"CSR Bluetooth and IEEE 802.11b Co-Existence Solution", *CSR BlueCore 2-External* Feb. 2003, 20 pages.
"CSR Co-Existence Scheme Definition", *BlueCore 3-External* Nov. 2003, 8 pages.
"How 802.11b/g WLAN and Bluetooth Can Play", *Philips* Sep. 2005, 5 pages.
"Three Wire Interface", *Infineon Technologies* Functional Design Document Oct. 4, 2004, 6 pages.
"Wi-Fi and Bluetooth—Interference Issues", *Hewlett Packard* Jan. 2002, 6 pages.
U.S. Appl. No. 12/236,604, filed Sep. 24, 2008, Nam, Kyungwan et al.
U.S. Appl. No. 12/633,150, filed Dec. 8, 2009, Luthra, Nanev.
U.S. Appl. No. 12/639,207, filed Dec. 16, 2009, Luthra, Manev.
Golmie, N.; Chevrollier, N.; Rebala, O.; , "Bluetooth and WLAN coexistence: challenges and solutions," Wireless Communications, IEEE, vol. 10, No. 6, pp. 22-29, Dec. 2003 doi: 10.1109/MWC.2003.1265849 URL: http://ieeexplore.ieee.org/stamp/stamp.jsp?tp=&arnumber=1265849&isnumber=28311.
"U.S. Appl. No. 12/633,150 Office Action", Jun. 19, 2012, 35 pages.
"U.S. Appl. No. 12/639,207 Office Action", Apr. 24, 2012, 31 pages.

\* cited by examiner

AGGREGATION COEXISTENCE MECHANISM FOR WIRELESS DEVICES

BACKGROUND

Embodiments of the inventive subject matter generally relate to the field of wireless communication and, more particularly, to an aggregation coexistence mechanism for wireless devices.

When wireless devices are in close proximity to each other, communication from one wireless device may interfere with communication from the other wireless device. For example, when Bluetooth® and wireless local area network (WLAN) devices operate in close proximity to each other, the radio protocol of one device can interfere with the radio protocol of the other device. The Bluetooth device can use adaptive frequency hopping (AFH) techniques to avoid frequencies on which a WLAN transmission is detected. Packet traffic arbitration (PTA) may also be used to provide dynamic information to the wireless devices to prevent the Bluetooth and WLAN devices from accessing a communication medium at the same time.

SUMMARY

Various embodiments are disclosed for an aggregation coexistence mechanism for wireless devices. In some embodiments, it is detected that a first wireless network device of a communication system comprises data to be transmitted. A communication schedule for a second wireless network device of the communication system is determined. A communication time interval for the first wireless network device is calculated based on the communication schedule for the second wireless network device. A number of data packets of the first wireless network device that can be transmitted during the communication time interval is determined. An aggregate for the first wireless network device comprising the determined number of data packets that can be transmitted during the communication time interval is generated. It is determined that a start time instant of the communication time interval, at which the aggregate for the first wireless network device should be transmitted for successful transmission of the aggregate during the communication time interval, has expired, and transmission of the aggregate for the first wireless network device has not been initiated. The communication time interval for the first wireless network device and the aggregate for the first wireless network device is modified.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to scheduling WLAN and Bluetooth communication for coexistence between WLAN and Bluetooth devices, in other embodiments communication may be scheduled for other wireless standards and devices, e.g., WiMAX, ZigBee®, Wireless USB devices, etc. In other instances, well-known instruction instances, protocols, structures, and techniques have not been shown in detail in order not to obfuscate the description.

Interference between wireless radio devices (e.g., a Bluetooth device and a WLAN device) may be caused when the two wireless devices are collocated on a common system and/or are communicating (e.g., transmitting or receiving signals) in close proximity to each other. Such interference between the collocated Bluetooth and the WLAN devices can result in performance degradation. In some embodiments, a coexistence unit can schedule WLAN communications around Bluetooth communications based on a Bluetooth communication schedule that indicates when and for how long the Bluetooth device will transmit or receive Bluetooth signals. The coexistence unit can also influence the Bluetooth and WLAN communications depending on priority of the Bluetooth and WLAN communications. For example, the coexistence unit may direct the Bluetooth device to defer a low priority Bluetooth transmission in favor of a high priority WLAN transmission. Moreover, the coexistence unit can also control a number of WLAN packets transmitted in an aggregate based on available time until a high priority Bluetooth communication.

Figure 1:
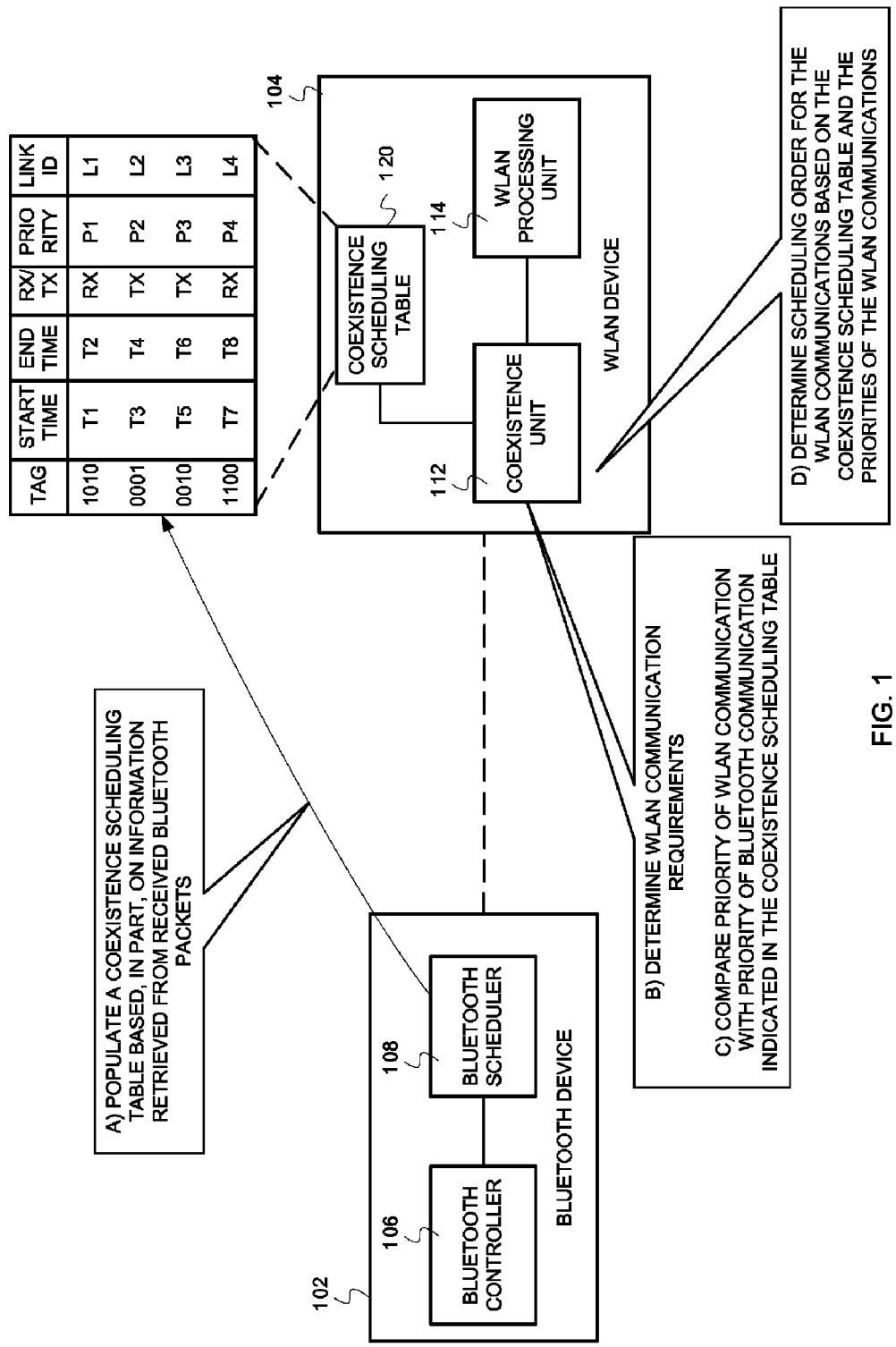
FIG. 1 is an example conceptual diagram illustrating operations for scheduling transmission of WLAN and Bluetooth packets.

FIG. 1 is an example conceptual diagram illustrating operations for scheduling transmission of WLAN and Bluetooth packets. FIG. 1 comprises a Bluetooth device 102 and a WLAN device 104. The Bluetooth device 102 comprises a Bluetooth controller 106 and a Bluetooth scheduler 108. The Bluetooth controller 106 is coupled to the Bluetooth scheduler 108. The WLAN device 104 comprises a coexistence unit 112, a WLAN processing unit 114, and a coexistence-scheduling table 120. The coexistence unit 112 is coupled to the WLAN processing unit 114. The coexistence unit 112 schedules WLAN transmit/receive operations in accordance with content in coexistence-scheduling table 120. In some implementations, the coexistence unit 112 may be implemented as a state machine, in firmware, as a hardware module, on the Bluetooth device 102, etc. The Bluetooth device 102 and the WLAN device 104 may be collocated on a host wireless device (not shown). In some implementations, the host wireless device may include communication systems such as a laptop, a netbook, a portable gaming console, a mobile phone, a personal digital assistant (PDA), or other communication systems comprising the Bluetooth device 102 and the WLAN device 104 in close proximity to each other (e.g., collocated in the same chip or circuit board). The Bluetooth device 102 and the WLAN device 104 may communicate via a coexistence interface depicted by a dashed line between the Bluetooth device 102 and the WLAN device 104. In one implementation, the coexistence interface can be a physical interface comprising a set of physical wires connecting the Bluetooth device 102 and the WLAN device 104. In another implementation, the coexistence interface can be a message based coexistence interface (MCI). The coexistence unit 112 can transmit coexistence messages to notify the Bluetooth device 102 of when to abort transmission, when to relinquish control of the communication medium, etc.

At stage A, the Bluetooth scheduler 108 populates the coexistence-scheduling table 120 based, in part, on information retrieved from received Bluetooth packets. The Bluetooth controller 106 receives a Bluetooth packet and determines an estimated start time and end time for future Bluetooth communications. In one implementation, the Bluetooth scheduler 108 may determine the estimated start time and end time for the future Bluetooth communications. For example, in response to receiving the Bluetooth packet header and information about the length of the body of the Bluetooth packet, the Bluetooth scheduler 108 may determine a start and an end time for transmitting an acknowledgement for the received Bluetooth packet. In another implementation, the Bluetooth controller 106 may receive a synchronous connection (SCO) packet from another Bluetooth device and the Bluetooth scheduler 108 may determine (from the received SCO packet) a time instant at which a next SCO packet will be transmitted. As another example, the Bluetooth controller 106 may initiate a SCO connection, and the Bluetooth scheduler 108 may determine a schedule (e.g., start and end times) for periodically transmitting SCO packets to other Bluetooth devices. The Bluetooth scheduler 108 populates the coexistence-scheduling table 120 on the WLAN device 104. The Bluetooth scheduler 108 may transmit Bluetooth scheduling information identifying the Bluetooth communication (e.g., using a tag), a start time for the Bluetooth communication, an end time for the Bluetooth communication, a priority for the Bluetooth communication, a link number, etc. The Bluetooth scheduler 108 may transmit the Bluetooth scheduling information via the coexistence interface. As depicted in FIG. 1, the coexistence-scheduling table 120 comprises the start and the end time for the Bluetooth communication, the priority of the Bluetooth communication, whether Bluetooth packets will be transmitted or received, and a link on which the Bluetooth packets will be transmitted/received. In some implementations, entries in the Bluetooth scheduling table 120 may be sorted by start times. The Bluetooth scheduler 108 may constantly update the entries in the coexistence-scheduling table 120 depending on previously received Bluetooth packets. For example, the Bluetooth scheduler 108 may receive a NACK packet, schedule a retransmission of a Bluetooth packet, accordingly update the coexistence-scheduling table 120, and notify the coexistence unit 112.

At stage B, the coexistence unit 112 determines WLAN communication requirements. For example, the coexistence unit 112 may determine that there exist WLAN packets that should be transmitted. The coexistence unit 112 may also determine the priority of the WLAN communications.

At stage C, the coexistence unit 112 compares the priority of the WLAN communications with the priority of the Bluetooth communications indicated in the coexistence-scheduling table 120. In one implementation, the coexistence unit 112 can analyze the coexistence-scheduling table 120 and compare the length of the WLAN packet to be transmitted with gaps between consecutive Bluetooth communications listed in the coexistence-scheduling table 120. In another implementation, the coexistence unit 112 can determine a number of WLAN packets that can be transmitted while the Bluetooth device 102 is inactive. In the inactive state, the Bluetooth device 102 may not transmit or receive packets. However, other components of the Bluetooth device 102 (e.g., a processing unit) may be operational.

At stage D, the coexistence unit 112 determines a scheduling order for the WLAN communications ("WLAN scheduling order") based on the coexistence-scheduling table and the priorities of the Bluetooth and the WLAN communications, as will be further described below with reference to FIGS. 5-6. For example, the coexistence unit 112 may determine that the priority of a WLAN transmission is higher than the priority of a Bluetooth transmission and may notify the Bluetooth scheduler 108 to reschedule the Bluetooth transmission (e.g., abort the transmission, defer the transmission, etc). In some implementations, the coexistence unit 112 may communicate the WLAN scheduling order to the Bluetooth scheduler 108. The Bluetooth scheduler 108 can direct the Bluetooth controller 106 to transmit/receive Bluetooth packets or relinquish control of the communication medium based on the WLAN scheduling order.

Figure 2:
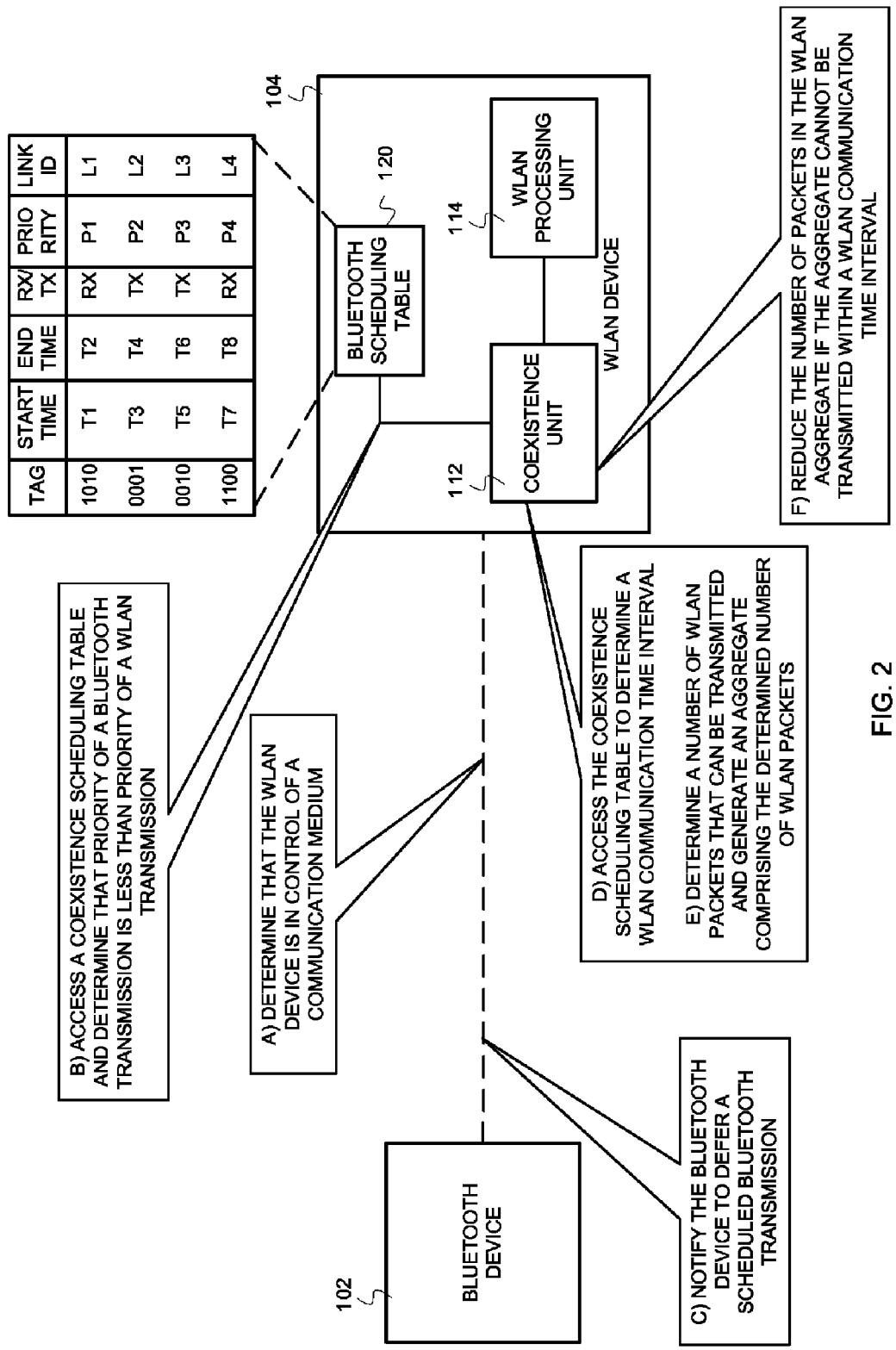
FIG. 2 is an example conceptual diagram illustrating example operations for determining and varying a WLAN aggregate size.

FIG. 2 is an example conceptual diagram illustrating example operations for determining and varying a WLAN aggregate size. By grouping WLAN packets to form a WLAN aggregate, overhead associated with WLAN packet transmission and processing can be minimized. The WLAN aggregate size may refer to a number of WLAN packets that can be grouped together to form the WLAN aggregate. In some instances, because the coexistence unit 112 schedules WLAN transmissions in between scheduled Bluetooth communications (as described in FIG. 1), the number of WLAN packets that can be transmitted as part of the WLAN aggregate can vary depending on the available time between two Bluetooth communications.

At stage A, the coexistence unit 112 determines that the WLAN device 104 is in control of a communication medium (e.g., can transmit or receive WLAN packets). In some implementations, the Bluetooth device 102 may transmit a notification to the coexistence unit 112, via a coexistence interface, indicating that Bluetooth communication is complete. In another implementation, the coexistence unit 112 may determine that the Bluetooth device 102 has relinquished control of the communication medium to the WLAN device 104 based on the coexistence-scheduling table 120. In other implementations, the coexistence unit 112 may issue an interrupt to the Bluetooth device 102 and direct the Bluetooth device 102 to abort a Bluetooth transmission and relinquish control of the communication medium.

At stage B, the coexistence unit 112 accesses the coexistence-scheduling table 120 and determines that the priority of the Bluetooth transmission is less than the priority of a WLAN transmission. The coexistence unit 112 may compare the priority of the Bluetooth and the WLAN transmissions just before the WLAN device 104 gains control of the communication medium. For example, the coexistence unit 112 may compare the priority of the Bluetooth and WLAN transmissions 1 millisecond or other suitable time interval before the Bluetooth device 102 relinquishes control of the communication medium. In another implementation, the coexistence unit 112 may compare the priority of the Bluetooth and WLAN transmission as soon as the coexistence unit 112 determines that there exist WLAN packets to be transmitted. The coexistence unit 112 may determine a status (e.g., empty, filled, etc.) of a WLAN transmit queue and compare the priority of queued WLAN packets with the priority of ongoing and scheduled Bluetooth transmissions. In FIG. 2, the coexistence unit 112 determines that the priority of the WLAN transmission is greater than the priority of a next scheduled Bluetooth transmission. For example, the coexistence unit 112 may compare the priority of a scheduled Bluetooth Asynchronous Connectionless Link (ACL) transmission to the priority of a pending WLAN polling transmission and determine that the WLAN polling transmission has a higher priority than the Bluetooth ACL transmission.

At stage C, the coexistence unit 112 notifies the Bluetooth device 102 to defer the scheduled Bluetooth transmission. The coexistence unit 112 may identify the Bluetooth transmission to be deferred by a transmission identification number (e.g., a tag as depicted in the coexistence-scheduling table 120). In some implementations, successive scheduled Bluetooth transmissions may have a lower priority than pending WLAN transmissions. The coexistence unit 112 can transmit multiple notifications to the Bluetooth unit 102 indicating all the successive scheduled Bluetooth transmissions that should be deferred. Alternately, the coexistence unit 112 may transmit a single notification identifying the Bluetooth transmissions that should be deferred. The coexistence unit 112 may also indicate a time interval for which the WLAN device 104 will be in control of the communication medium.

At stage D, the coexistence unit 112 accesses the coexistence-scheduling table 120 to determine the time interval for which the WLAN device 104 will be in control of the communication medium ("WLAN communication time interval"). In other words, the coexistence unit 112 determines the time interval for which the communication medium will not be in use by the Bluetooth device 102. The coexistence unit 112 can access the coexistence-scheduling table 120 to identify a start and end time for each deferred Bluetooth transmission and can accordingly determine the WLAN communication time interval. The coexistence unit 112 can also determine a time instant at which a high priority Bluetooth transmission is scheduled to identify a time instant at which the WLAN device 104 should relinquish control of the communication medium to the Bluetooth device 102.

At stage E, the coexistence unit 112 determines a number of WLAN packets that can be transmitted within the WLAN communication time interval and directs the WLAN processing unit 114 to generate the WLAN aggregate comprising the determined number of WLAN packets. The coexistence unit 112 may determine the WLAN aggregate size based on the maximum size of the WLAN packet, a data rate of the communication medium, etc. In calculating the WLAN aggregate size, the coexistence unit 112 may also take into a consideration a time spent in sensing the communication medium, a time spent in performing request to send/clear to send (RTS/CTS) operations, a time required for receiving an acknowledgement for the transmitted WLAN packets, etc.

At stage F, the coexistence unit 112 directs the WLAN processing unit 114 to reduce the WLAN aggregate size if the WLAN aggregate cannot be transmitted within the WLAN communication time interval. For example, to avoid collision with other signals on the communication medium, the WLAN device 104 may be required to defer transmission for a predefined (or random) interval of time ("back-off interval"). The coexistence unit 112 may modify the WLAN communication time interval based on the back-off interval and recalculate the size of the WLAN aggregate. The coexistence unit 112 can communicate the modified WLAN communication time interval, the recalculated size of the WLAN aggregate, a number of WLAN frames that should be removed from the WLAN aggregate, and a time instant at which the WLAN aggregate should be transmitted.

It should be noted that the operations described with reference to FIGS. 1-2 are examples. For instance, in some implementations, the coexistence-scheduling table 120 may be located on the Bluetooth device 102, on the host wireless device, partly on the Bluetooth device and the WLAN device, etc. In some implementations, the coexistence unit 112 may be located on the Bluetooth device 102 and may receive notifications (e.g., from the WLAN processing unit 114, from the host device, etc.) indicating WLAN packets to be transmitted/received, and accordingly schedule WLAN communications.

Figure 3:
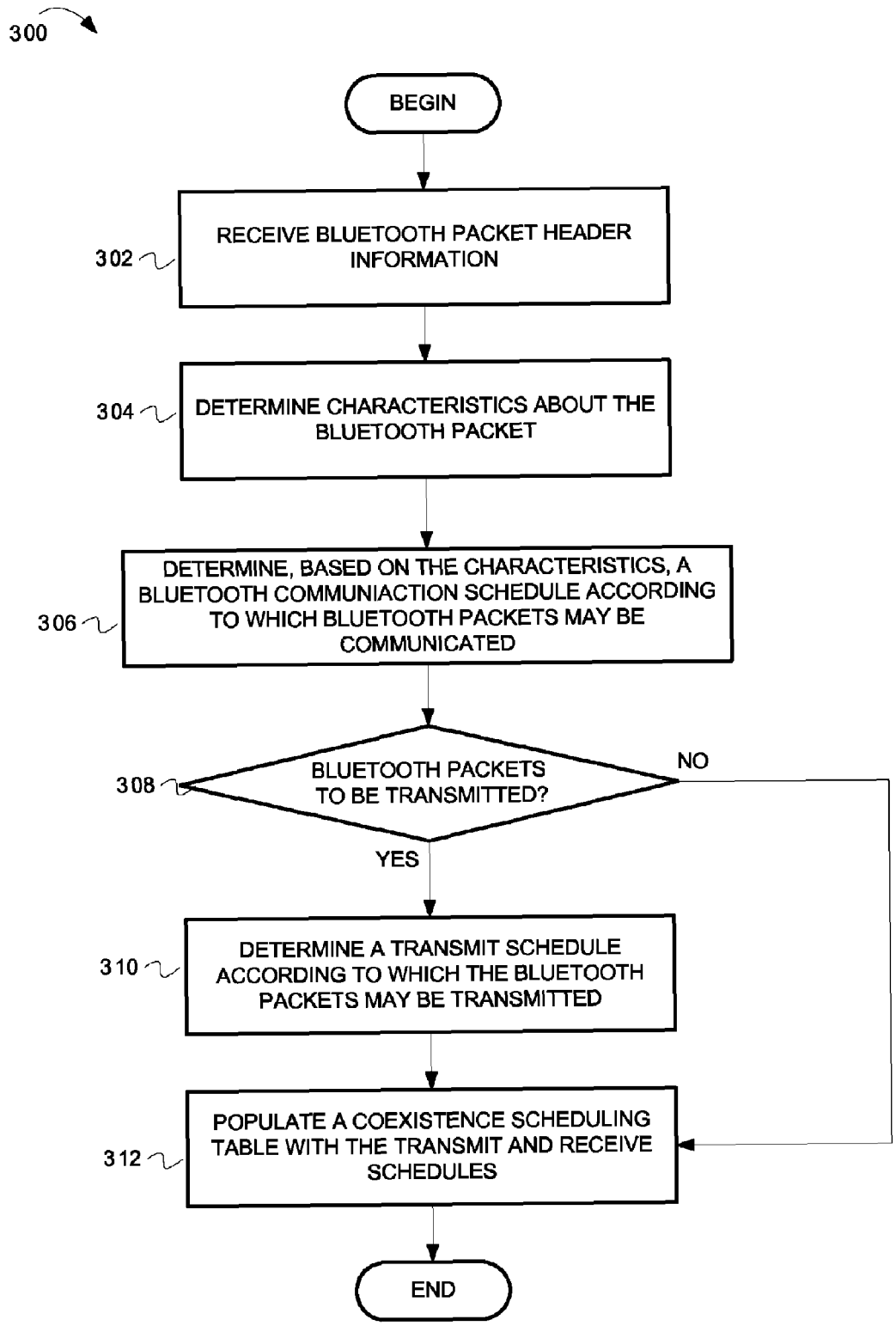
FIG. 3 is a flow diagram illustrating example operations for creating a scheduling table.

FIG. 3 is a flow diagram illustrating example operations for creating a scheduling table. Flow 300 begins at block 302.

At block 302, Bluetooth packet header information is received. For example, the Bluetooth controller 106 of FIG. 1 may receive the Bluetooth packet header information. The flow continues at block 304.

At block 304, characteristics of the Bluetooth packet are determined. In one implementation, the Bluetooth controller 106 can determine and indicate the characteristics of the Bluetooth packet to the Bluetooth scheduler 108. In another implementation, the Bluetooth scheduler 108 can determine the characteristics of the Bluetooth packet based on the Bluetooth packet header information. The Bluetooth packet can indicate characteristics such as type of the received Bluetooth packet (e.g., SCO, ACL, etc.), a priority of the received Bluetooth packet, etc. The characteristics of the Bluetooth packet may be determined based on information in the Bluetooth packet header. The flow continues at block 306.

At block 306, a schedule according to which other Bluetooth packets may be communicated ("Bluetooth communication schedule") is determined based on the characteristics of the received Bluetooth packet. The Bluetooth scheduler 108 may determine the Bluetooth communication schedule. The Bluetooth communication schedule can comprise a schedule of Bluetooth packet receptions ("Bluetooth receive schedule"). For example, the Bluetooth scheduler 108 may determine that the received Bluetooth packet is part of a periodic SCO transmission and may accordingly calculate a start and end time for receiving future Bluetooth SCO packets. As another example, the Bluetooth scheduler 108 may determine that the received Bluetooth packet is one of multiple fragments of a large Bluetooth packet. As another example, the Bluetooth device may determine that a start and an end time for transmitting a Bluetooth packet (e.g., an acknowledgement (ACK) packet, packets to be retransmitted, etc). The Bluetooth scheduler 108 may determine, if possible, a start and end time for receiving the other fragments of the large Bluetooth packet. Additionally, the Bluetooth scheduler 108 may also determine a Bluetooth communication frequency on which the Bluetooth packets will be received. The flow continues at block 308.

At block 308, it is determined whether there exist Bluetooth packets to be transmitted. The Bluetooth scheduler 108 may access a Bluetooth transmit queue and determine whether there exist Bluetooth packets to be transmitted. If the Bluetooth scheduler 108 determines that there exist Bluetooth packets to be transmitted, the flow continues at block 310. Otherwise, the flow continues at block 312.

At block 310, a Bluetooth transmit schedule according to which Bluetooth packets may be transmitted is determined (e.g., by the Bluetooth scheduler 108 of FIG. 1). For example, an acknowledgement may need to be transmitted after a Bluetooth packet is received. As another example, Bluetooth packets may need to be transmitted periodically as part of a periodic SCO connection. As another example, Bluetooth signaling and polling packets may be transmitted to establish connections with other Bluetooth devices, maintain connections with connected Bluetooth devices, etc. As another example, a Bluetooth packet may need to be retransmitted if an acknowledgement has not been received. The Bluetooth transmit schedule can indicate a start time and an end time for transmitting the Bluetooth packets, a priority of the Bluetooth packets to be transmitted, a Bluetooth link on which the Bluetooth packets will be transmitted, etc. The flow continues at block 312.

At block 312, a coexistence-scheduling table is populated with the Bluetooth transmit schedule and the Bluetooth receive schedule. For example, the Bluetooth scheduler 108 may populate the coexistence-scheduling table 120 with the Bluetooth transmit schedule and the Bluetooth receive schedule. The coexistence-scheduling table 120 can comprise estimated start and end times of the Bluetooth packets, whether the packet is being transmitted of received, the priority of the Bluetooth communication (transmission or reception), a Bluetooth link on which the Bluetooth packets will be transmitted or received, etc. The coexistence-scheduling table 120 can also identify the Bluetooth communication using a tag value or other Bluetooth communication identifier. The coexistence-scheduling table 120 may be sorted by Bluetooth communication start times. The coexistence-scheduling table 120 can comprise information about upcoming Bluetooth packets to be communicated and Bluetooth packets to be communicated in the future (e.g., periodic communications). In one implementation, the Bluetooth scheduler 108 may populate the coexistence-scheduling table 120 on the Bluetooth device 102 and transmit the coexistence-scheduling table 120 (via a coexistence interface) to the coexistence unit 112. In another implementation, the Bluetooth scheduler 108 may populate the coexistence-scheduling table 120 located on the WLAN device (e.g., the WLAN device 104). In another implementation, the Bluetooth scheduler 108 may notify the coexistence unit 112 of the Bluetooth transmit schedule and the Bluetooth receive schedule and the coexistence unit 112 may populate the coexistence-scheduling table 120. From block 312, the flow ends.

Figure 4:
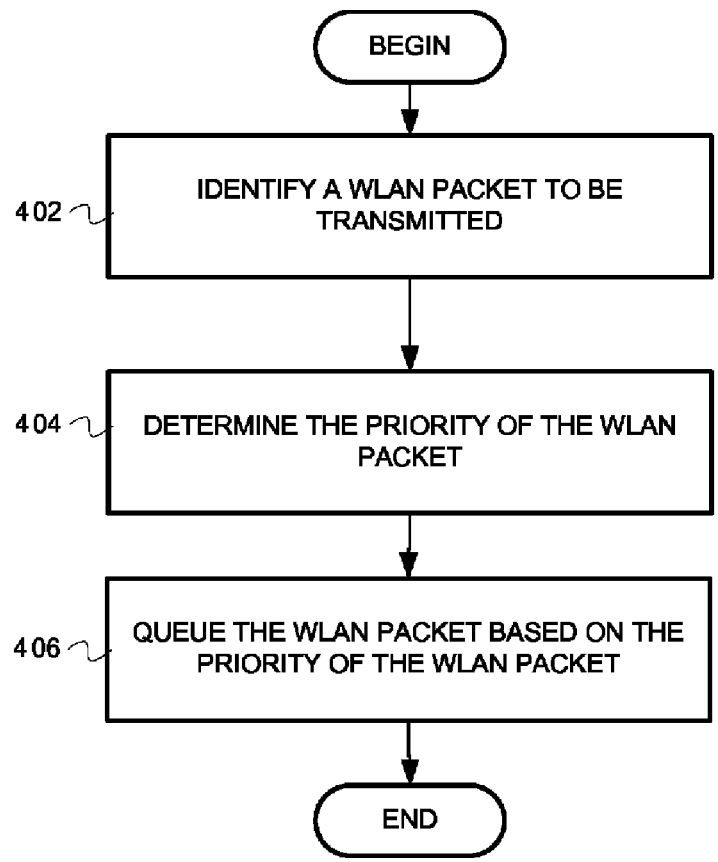
FIG. 4 is a flow diagram illustrating example operations for queuing WLAN packets to be transmitted.

FIG. 4 is a flow diagram illustrating example operations for queuing WLAN packets to be transmitted. Flow 400 begins at block 402.

At block 402, a WLAN packet to be transmitted is identified. In one implementation, the WLAN processing unit 114 of FIG. 1 may receive and notify the coexistence unit 112 of the WLAN packet to be transmitted. In some implementations, a host device may generate the WLAN packet to be transmitted and store the WLAN packet in a WLAN transmit queue. The coexistence unit 112 may determine that there exists a WLAN packet to be transmitted in response to receiving a notification from the host wireless device, receiving a notification from the WLAN processing unit 114, querying the WLAN transmit queue, etc. The flow continues at block 404.

At block 404, priority of the WLAN packet is determined. In one implementation, the coexistence unit 112 may determine the priority of the WLAN packet. The coexistence unit 112 may determine the priority of the WLAN packet based on content of the WLAN packet ((e.g., header of the WLAN packet, body of the WLAN packet, etc.), a source of the WLAN packet, etc. For example, a WLAN retransmit packet may have a higher priority than a probe request frame. As another example, a beacon frame may have a higher priority than a response to an announcement traffic indication map (ATIM). In some implementation, the priority of the WLAN packet may be user-defined. The flow continues at block 406.

Figure 7A:
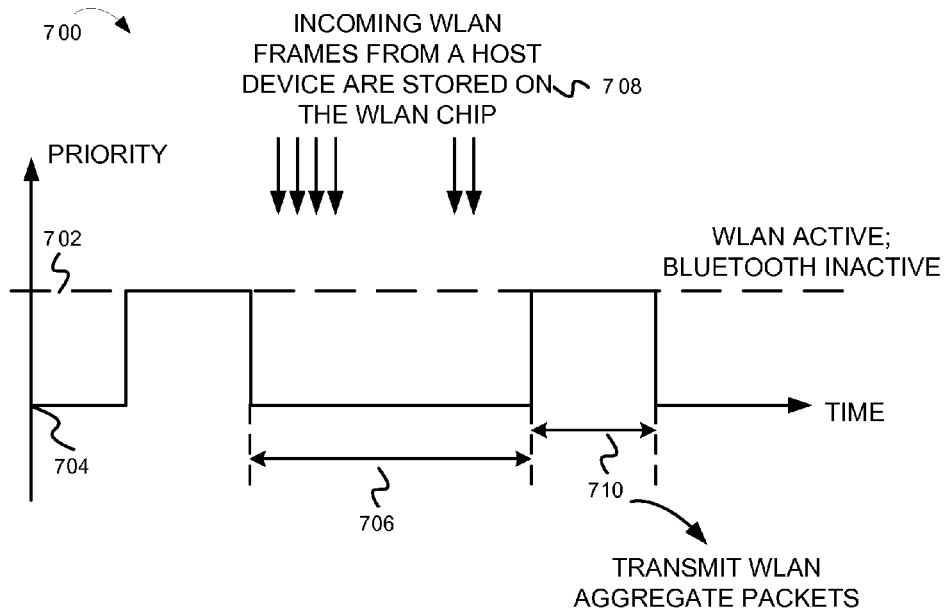
FIG. 7A depicts a timing diagram illustrating queuing the WLAN packets until the Bluetooth device is inactive.

At block 406, the WLAN packet is queued based on the priority of the WLAN packet. The host device (e.g., the WLAN device 104 of FIG. 1) may comprise multiple queues for storing the WLAN packets. In one implementation, the host device comprises eight queues. In another implementation, the host device can comprise any suitable number of queues. Each queue may be associated with a priority or a range of priorities. The host device may place the WLAN packets in the appropriate queue based on the priority of the WLAN packet. In another implementation, the WLAN processing unit 114 may queue the WLAN packets in the appropriate queue. The coexistence unit 112 may direct the WLAN processing unit 114 to transmit the WLAN packets after the coexistence unit 112 determines that the Bluetooth device 102 is inactive. The concept of queuing the WLAN packets until the Bluetooth device 102 is inactive is further illustrated in FIG. 7A. FIG. 7A depicts a graph of priority (on Y-axis) versus time (on X-axis). At priority level 702, depicted by a dashed line, the WLAN device 104 is active while the Bluetooth device 102 is inactive. In the inactive state, the Bluetooth device 102 may not transmit or receive packets. However, other components of the Bluetooth device 102 (e.g., a processing unit) may be operational. Likewise, in the active state, the WLAN device 104 may transmit or receive packets. At priority level 704, the Bluetooth device 102 is active while the WLAN device 104 is inactive (i.e., in sleep mode). During time interval 706, the Bluetooth communication has a higher priority as compared to the WLAN communication (or the WLAN device 104 is inactive). In other words, during the time interval 706, the Bluetooth device 102 is either transmitting or receiving Bluetooth packets, while the WLAN device 104 is in sleep mode. Incoming WLAN packets 708, received by the WLAN device 104 during the time interval 706, are queued (based on WLAN packet priority) on the host device. In some implementations, the incoming WLAN packets 708 may be received from the host device and may be stored on the WLAN device 104. During time interval 710, the WLAN device 104 is active while the Bluetooth device 102 is inactive. The WLAN packets that were queued during the time interval frames 706 are formed into an aggregate and are transmitted during the time interval 710. Referring back to FIG. 4, in some implementations, the coexistence unit 112 may direct the Bluetooth unit to abort a low priority Bluetooth transmission so that the WLAN processing unit 114 can transmit a high priority WLAN packet. From block 406, the flow ends.

After the Bluetooth device 102 relinquishes control of the communication medium, the WLAN packets may be dequeued and transmitted to the WLAN device 104 (e.g., a WLAN chip on the host device). The WLAN packets may be transmitted from the queues on the host device and queued (based on priority) in a WLAN transmit queue on the WLAN device 104. In one implementation, the number of frames in the WLAN transmit queue may be determined based on the number of WLAN packets that can be transmitted (e.g., as a WLAN aggregate) within the WLAN communication time interval. Operations for calculating and varying the number of WLAN packets that can be transmitted and for calculating the WLAN communication time interval are described with reference to FIGS. 5-6.

Figure 5:
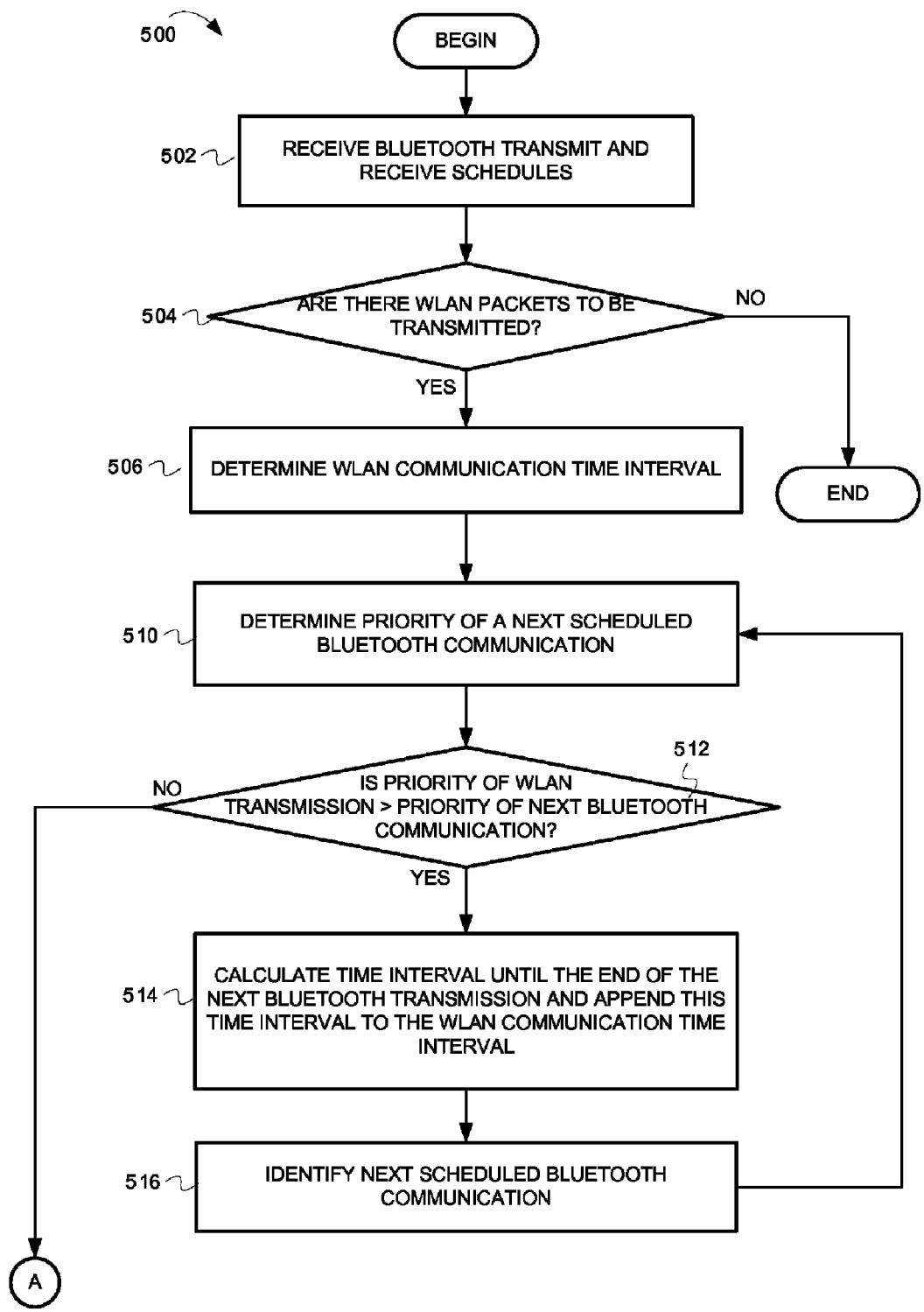
FIG. 5 depicts a flow diagram illustrating example operations for determining and varying a size of a WLAN aggregate.
Figure 6:
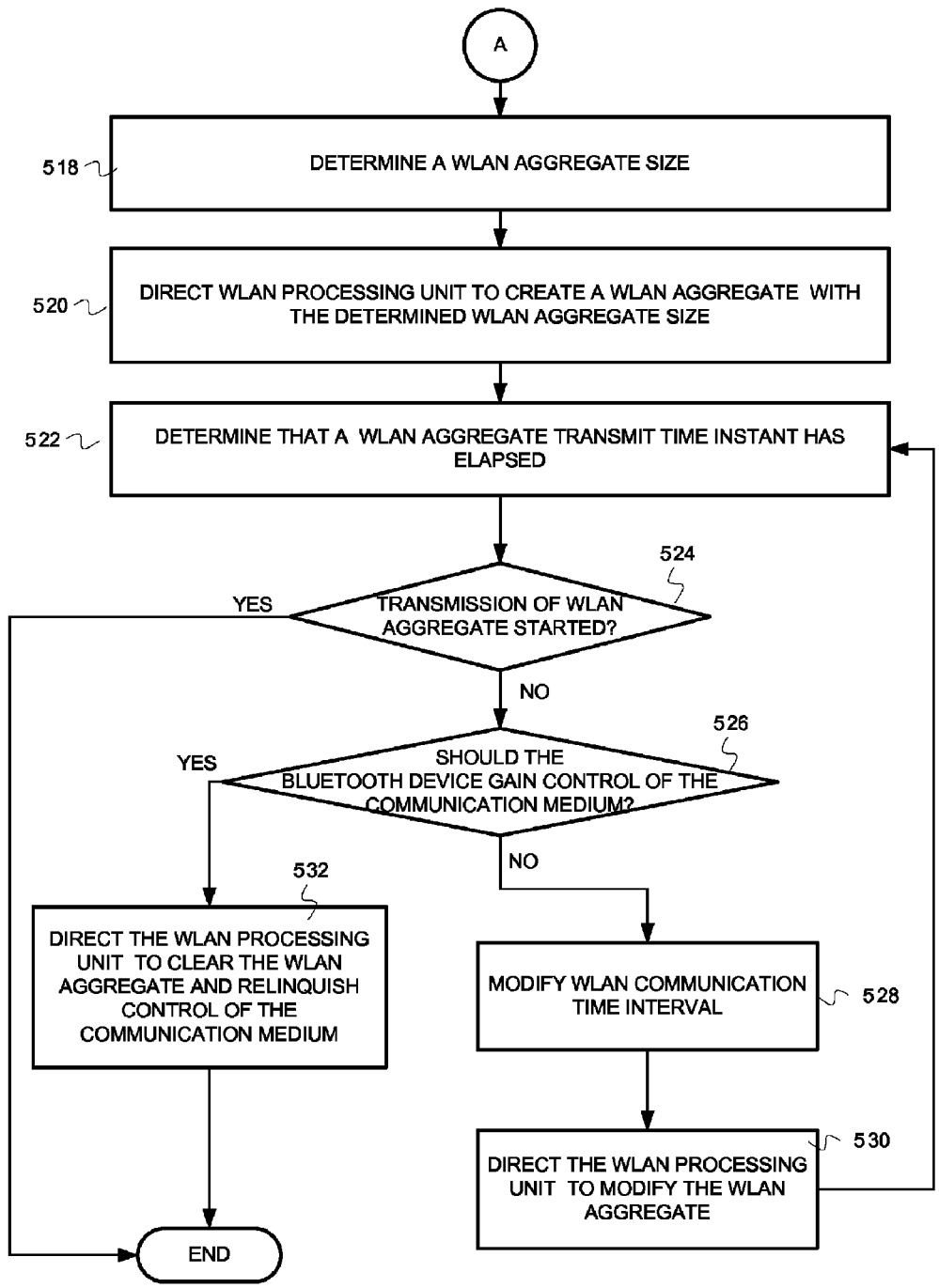
FIG. 6 depicts a flow diagram illustrating example operations for determining and varying a size of a WLAN aggregate.

FIG. 5 and FIG. 6 depict a flow diagram illustrating example operations for determining and varying a size of a WLAN aggregate. Flow 500 begins at block 502.

At block 502, Bluetooth transmit and receive schedules are received. For example, the coexistence unit 112 of FIG. 1 may receive the Bluetooth transmit and receive schedules from the Bluetooth scheduler 108. The Bluetooth transmit and the receive schedules may indicate a start and an end time for communicating (e.g., transmitting or receiving) the Bluetooth packets, a priority of the Bluetooth communications, a Bluetooth link on which the Bluetooth communications will be initiated, etc. In one implementation, the coexistence unit 112 may receive the Bluetooth transmit and receive schedules in a coexistence-scheduling table 120. In another implementation, the coexistence unit 112 may create and populate the coexistence-scheduling table 120 based on the received transmit and receive schedules received from the Bluetooth scheduler 108. The flow continues at block 504.

At block 504, it is determined whether there exist WLAN packets to be transmitted. For example, the coexistence unit 112 may determine whether there exist WLAN packets to be transmitted. In one implementation, the coexistence unit 112 may access a WLAN transmit queue to determine whether there exist WLAN packets to be transmitted. In another implementation, the coexistence unit 112 may receive a notification (e.g., from a host device, from WLAN processing unit 114, etc.) when the WLAN packets are generated. If coexistence unit 112 determines that there exist WLAN packets to be transmitted, the flow continues at block 506. Otherwise, the flow ends.

At block 506, a WLAN communication time interval is determined. For example, the coexistence unit 112 may determine the WLAN communication time interval. The coexistence unit 112 may calculate the WLAN communication time interval as a time from an end of a Bluetooth communication to a start of a next scheduled Bluetooth communication. Referring to the Bluetooth scheduling table 120, the coexistence unit 112 may calculate the WLAN communication time interval as the time interval between end time t2 and start time t3. As another example, the coexistence unit 112 may calculate the WLAN communication time interval as the time interval between end time t4 and start time t5. In some implementations, in addition to accessing the coexistence-scheduling table 120 to determine when the Bluetooth device 102 will be inactive, the coexistence unit 112 may also receive a notification from the Bluetooth device 102 indicating when and for long the Bluetooth device 102 will be inactive. The coexistence unit 112 may also receive a notification from the Bluetooth device 102 indicating when and for long the Bluetooth device 102 will be transmitting or receiving Bluetooth packets. In some implementations, in calculating the WLAN communication time interval, the nature of the next Bluetooth communication may also be taken into consideration. The WLAN communication time interval may vary depending on the priority of the next scheduled Bluetooth communication and whether the next scheduled Bluetooth communication is a Bluetooth packet transmission or a Bluetooth packet reception, as will be further described below. The flow continues at block 510.

At block 510, a priority of the next scheduled Bluetooth communication is determined. The coexistence unit 112 may access the coexistence-scheduling table 120 and determine (e.g., from the "priority" column in the coexistence-scheduling table 120) the priority of the next scheduled Bluetooth communication. Additionally, the coexistence unit 112 may also determine, e.g., from the coexistence-scheduling table 120 whether the next scheduled communication is a Bluetooth packet transmission or a Bluetooth packet reception (e.g., from the "RX/TX" column in the coexistence-scheduling table 120). The flow continues at block 512.

At block 512, it is determined whether the priority of a WLAN transmission is greater than the priority of the next Bluetooth communication. For example, the coexistence unit 112 may determine whether the priority of the WLAN transmission is greater than the priority of the next Bluetooth communication. The coexistence unit 112 may determined the priority of the WLAN transmission based on data being transmitted in the WLAN packet, a source of the WLAN packet, a destination of the WLAN packet, etc. Typically, after the WLAN packets are transmitted, the WLAN device 104 receives a Block Acknowledgement (BACK) from the WLAN device that received the WLAN packets. In some implementations, in calculating the WLAN communication time interval, the nature of the next Bluetooth communication may also be taken into consideration. In some implementations, if the priority of the next Bluetooth communication is greater than the priority of the WLAN transmission, prior to the operations in block 518, the coexistence unit 112 determines whether to adjust the WLAN communication time interval based on whether the Bluetooth communication is a reception or transmission. If the next scheduled Bluetooth communication is a Bluetooth packet reception, parallel reception of the Bluetooth packet by the Bluetooth device 102 and the BACK by the WLAN device 104 may be possible. Thus, a stop time of the WLAN communication time interval may not account for a time interval required for reception of the BACK. The stop time of the WLAN communication time interval may coincide with or may be very close to a start time of the Bluetooth packet reception. However, if the next scheduled Bluetooth communication is a Bluetooth packet transmission, the WLAN communication time interval and consequently the number of WLAN packets that can be transmitted may be modified so that the WLAN device 104 can successfully receive the BACK before start of the Bluetooth packet transmission. If it is determined that the priority of the WLAN transmission is greater than the priority of the next scheduled Bluetooth communication, the flow continues at block 514. Otherwise, the flow continues at block 518 in FIG. 6.

Figure 7B:
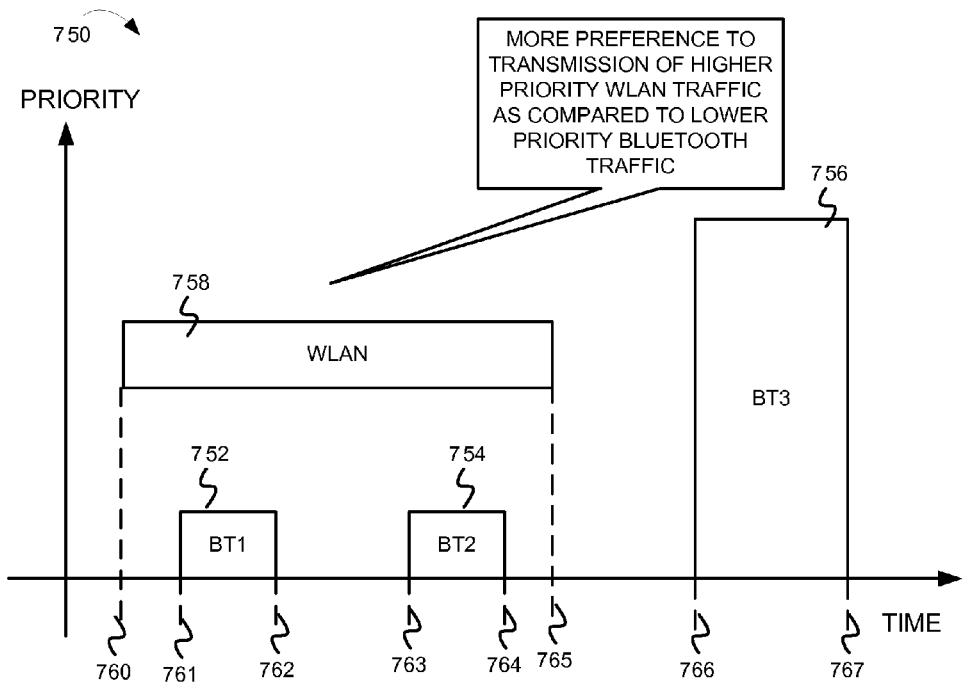
FIG. 7B depicts a timing diagram illustrating rescheduling communication based on priority of the communication.

At block 514, a time interval until the end of the next scheduled Bluetooth transmission is determined and is appended to the WLAN communication time interval. The coexistence unit 112 can determine (e.g., by accessing the coexistence-scheduling table 120) the time interval until the end of the next scheduled Bluetooth transmission. The coexistence unit 112 can increase the WLAN communication time interval by the time until the end of the next scheduled Bluetooth transmission. In other words, the coexistence unit 112 can extend the WLAN communication time interval to enable WLAN communications during low priority Bluetooth transmissions. The coexistence unit 112 can direct the Bluetooth scheduler 108 and/or the Bluetooth controller 106 to defer the Bluetooth transmission if the coexistence unit 112 determines that the priority of the WLAN transmission is greater than the priority of the Bluetooth transmission. This is further illustrated in FIG. 7B. FIG. 7B illustrates a graph of time (X axis) versus priority (Y axis). The graph 750 depicts two low priority Bluetooth transmissions 752 and 754, one high priority Bluetooth transmission 756, and one high priority WLAN transmission 758. The WLAN transmission 758 begins at time instant 760 and ends at time instant 765. The Bluetooth transmission 752 begins at time instant 761 and ends at time instant 762. The Bluetooth transmission 754 begins at time instant 763 and ends at time instant 764. The Bluetooth transmission 756 begins at time instant 766 and ends at time instant 767. The time instants 760-767 are in ascending time order. In one example, because the priority of the Bluetooth transmissions 752 and 754 is lower than the priority of the WLAN transmission 768, the coexistence unit 112 directs the Bluetooth device 102 to defer the Bluetooth transmissions 752 and 754 and directs the WLAN processing unit 114 to proceed with the WLAN transmission 758. For example, the WLAN transmission 758 may be a high priority voice over Internet protocol (VOIP) transmission, while the Bluetooth transmissions 752 and 754 may be lower priority ACL transmission. The WLAN device 104 may transmit or receive WLAN packets until just before the time instant 766. Because the priority of the Bluetooth transmission 756 is greater that the priority of the WLAN transmission 758, the Bluetooth device 102 gains control of the communication medium just before the time instant 766 and begins the Bluetooth transmission 756 at the time instant 766. In other words, the communication time interval for the WLAN transmission 758 would be calculated based on the actual communication time of the deferred Bluetooth transmission 752, the time interval between the Bluetooth transmissions 752 and 754, the actual communication time of the deferred Bluetooth transmission 754, and also the time interval between the Bluetooth transmissions 754 and 756. As described earlier, the communication time interval for the WLAN transmission 758 may also take into consideration a time interval required to receive an acknowledgement of the WLAN transmission 758. Referring back to FIG. 5, in some implementations, the coexistence unit 112 may direct the Bluetooth scheduler 108 to defer Bluetooth packet reception, if the priority of the WLAN communication is greater than the priority of the Bluetooth packet reception. The time interval for the Bluetooth packet reception may be utilized for the WLAN communication. In other implementations, the coexistence unit 112 may not interfere with or direct the Bluetooth scheduler 108 to defer or abort Bluetooth packet reception in favor of higher priority WLAN transmission. In some implementations, the coexistence unit 112 may defer a high priority WLAN packet transmission in favor of the Bluetooth packet reception. The flow continues at block 516.

At block 516, a next scheduled Bluetooth communication is identified. The coexistence unit 112 may identify the next scheduled Bluetooth communication by accessing the coexistence-scheduling table 120. The flow loops back and continues at block 508 where the WLAN communication time interval is increased if it is determined that the next scheduled Bluetooth communication is a Bluetooth packet transmission and that the priority of the Bluetooth packet transmission is less than the priority of the WLAN transmission.

At block 518, a WLAN aggregate size is determined. For example, the coexistence unit 112 may determine the WLAN aggregate size by determining a number of WLAN packets that can be transmitted within the WLAN communication time interval. The coexistence unit 112 may determine the number of WLAN packets that can be transmitted within the WLAN communication time interval based on a maximum size of the WLAN packet and a data rate of the communication medium. The coexistence unit 112 may also take into consideration a time spent in 1) sensing the communication medium, 2) performing request to send/clear to send (RTS/CTS) operations, 3) receiving an acknowledgement for the transmitted WLAN packets, etc. while determining the number of WLAN packets that can be transmitted. As described earlier, in some implementations, the WLAN aggregate size may be influenced by whether or not the next scheduled Bluetooth communication is a Bluetooth packet reception or a Bluetooth packet transmission. In one implementation, if the next scheduled Bluetooth communication is a Bluetooth packet reception, transmission of the WLAN packets may continue until the start of the Bluetooth packet reception and the acknowledgement of the WLAN packets may be received in parallel with the Bluetooth receive packet. However, if the next scheduled Bluetooth communication is Bluetooth packet transmission, transmission of the WLAN packets may be stopped prior to the start of the Bluetooth packet transmission to ensure that the acknowledgement of the WLAN packets is received before the start of the Bluetooth packet transmission. The flow continues at block 520.

At block 520, the WLAN processing unit is directed to create a WLAN aggregate with the determined WLAN aggregate size. For example, the coexistence unit 112 may direct the WLAN processing unit 114 to create the WLAN aggregate comprising the number of WLAN packets determined at block 518. In one implementation, the WLAN processing unit 114 may create the WLAN aggregate as one packet comprising multiple smaller WLAN packets. The WLAN aggregate may comprise a single header for the multiple WLAN packets in the WLAN aggregate. In another implementation, the WLAN processing unit 114 may not create a WLAN aggregate but may transmit individual WLAN packets (each with their own header) such that the sum of transmission times of each individual WLAN packet does not exceed the WLAN communication time interval. The coexistence unit 112 may also indicate, to the WLAN processing unit 114, a start time at which the WLAN aggregate should be transmitted ("WLAN aggregate transmit time instant"). In one implementation, the coexistence unit 112 may calculate the WLAN aggregate transmit time instant as the time at which the WLAN processing unit 114 can initiate transmission of the WLAN aggregate to ensure that the WLAN aggregate can be successfully transmitted to (along with receiving an acknowledgement from) another WLAN device. The coexistence unit 112 may calculate the latest the WLAN processing unit 114 can transmit the WLAN aggregate without the WLAN packet transmission transmit overlapping with a Bluetooth packet reception. In another implementation, the coexistence unit 112 may calculate the WLAN aggregate transmit time instant as the earliest the WLAN processing unit 114 can transmit the WLAN aggregate without an acknowledgement packet (transmitted by a receiving WLAN device) overlapping with a Bluetooth packet transmission. By calculating the WLAN aggregate size and creating the WLAN aggregate just before the Bluetooth device 102 relinquishes control of the communication medium and based on the Bluetooth device's transmit and receive schedules, the probability of having to clear the WLAN aggregate or being unable to transmit the WLAN aggregate because of low data rate, insufficient time, etc. is reduced. The flow continues at block 522.

At block 522, it is determined that the WLAN aggregate transmit time instant has expired. For example, the coexistence unit 112 may determine that the WLAN aggregate transmit time instant has expired. The coexistence unit 112 may comprise a timer with an initial value equal to the time until the start of the WLAN aggregate transmit time instant. The timer may count down to zero and trigger the coexistence unit 112 when the timer reaches zero. The flow continues at block 524.

At block 524, it is determined whether transmission of the WLAN aggregate has started. For example, the coexistence unit 112 may determine whether the transmission of the WLAN aggregate has started in response to determining that the WLAN aggregate transmit time instant has expired. The WLAN aggregate transmit time instant may expire before the WLAN aggregate has been transmitted if the WLAN processing unit 114 is unable to transmit the WLAN aggregate. For example, the WLAN processing unit 114 may sense the communication medium, detect another device transmitting on the communication medium, and temporarily defer transmission for a specified time interval. Alternatively, the WLAN processing unit 114 may transmit the WLAN aggregate if the WLAN processing unit 114 determines that the communication medium is devoid of other interfering signals. If it is determined that the transmission of the WLAN aggregate has started, the flow ends. Otherwise, the flow continues at block 526.

At block 526, it is determined whether the Bluetooth device should gain control of the communication medium. For example, the coexistence agent 112 may determine whether the WLAN device 104 should relinquish control of the communication medium to the Bluetooth device 102. The coexistence unit 112 may access the coexistence-scheduling table 120 to determine whether the Bluetooth device 102 is scheduled to receive Bluetooth packets, whether the Bluetooth device 102 is scheduled to transmit a high priority Bluetooth packet relatively soon, whether there is insufficient time for a WLAN packet to be completely transmitted, etc. If it is determined that the Bluetooth device 102 should gain control of the communication medium, the flow continues at block 532. Otherwise, the flow continues at block 528.

At block 528, the WLAN communication time interval is modified. In one implementation, the coexistence unit 112 may shorten the WLAN communication time interval to reflect the amount of the time until the WLAN device 104 has to relinquish control of the communication medium to the Bluetooth device 102. While determining a modified WLAN communication time interval, the coexistence unit 112 may also take into consideration the time required for receiving an acknowledgement and the time for sensing the communication medium to ensure that there are no interfering transmissions on the communication medium. The coexistence unit 112 may also calculate a new WLAN aggregate size and determine how many WLAN packets should be removed from the WLAN aggregate to be in accordance with the new WLAN aggregate size. The flow continues at block 530.

At block 530, the WLAN processing unit is directed to modify the WLAN aggregate. For example, the coexistence unit 112 may direct the WLAN processing unit 114 to modify the WLAN aggregate by removing one or more WLAN packets from the WLAN aggregate. The coexistence unit 112 may communicate, to the WLAN processing unit 114, the number of WLAN packets that should be removed from the WLAN aggregate. The coexistence unit 112 may also indicate a modified WLAN aggregate transmit time instant to the WLAN processing unit 114. The WLAN processing unit 114 may modify the WLAN aggregate by removing a requisite number of WLAN packets from the WLAN aggregate and prepare to transmit the WLAN aggregate on or before the modified WLAN aggregate transmit time instant. From block 530, the flow loops back and continues at block 522, where the WLAN communication time interval and the number of WLAN packets in the WLAN aggregate are further shortened if it is determined that the WLAN aggregate transmit time instant has expired.

At block 532, the WLAN processing unit is directed to clear the WLAN aggregate and relinquish control of the communication medium. For example, the coexistence unit 112 may direct the WLAN processing unit 114 to clear a WLAN transmit queue comprising the WLAN packets in the WLAN aggregate and relinquish control of the communication medium. The coexistence unit 112 may also notify the Bluetooth scheduler 108 and/or the Bluetooth controller 106 that the WLAN device 104 will be inactive and that the Bluetooth device 102 may use the communication medium for Bluetooth communications. From block 532, the flow ends.

Although flow 500 in FIGS. 5-6 describe the WLAN aggregate size varying based on the WLAN communication time interval, when an access point transmits a WLAN packet, and/or when the Bluetooth device receives Bluetooth packets, the WLAN aggregate size can also be controlled based on one or more external inputs. In one implementation, the WLAN aggregate size may be controlled by a temperature based feedback system. The WLAN aggregate size may be reduced to reduce a transmit duty cycle when chip temperature is relatively high. For example, the coexistence unit 112 may receive an indication from the temperature based feedback system when the chip temperature increases above a specified threshold. The coexistence unit 112 may calculate a WLAN aggregate size so that the chip temperature is constant or so that the chip is not operating close to a break-down temperature. For example, the coexistence unit 112 may determine that the chip temperature will increase by 2 degrees if the WLAN aggregate size is six packets and that the chip temperature will increase by 20 degrees if a maximum number of WLAN packets are transmitted. The coexistence unit 112 may also vary time that the WLAN device is active to control the chip temperature. For example, the coexistence unit 112 may reduce the duty cycle (e.g., by creating a smaller aggregate, forcing the WLAN device to remain in an inactive state, etc.) if the chip temperature is greater than the specified threshold.

In some implementations, parallel receive operations, parallel transmit operations, or parallel transmit/receive operations may be allowed and hence parallel WLAN and Bluetooth communication operations maybe scheduled as described with reference to FIGS. 8-9.

Figure 8:
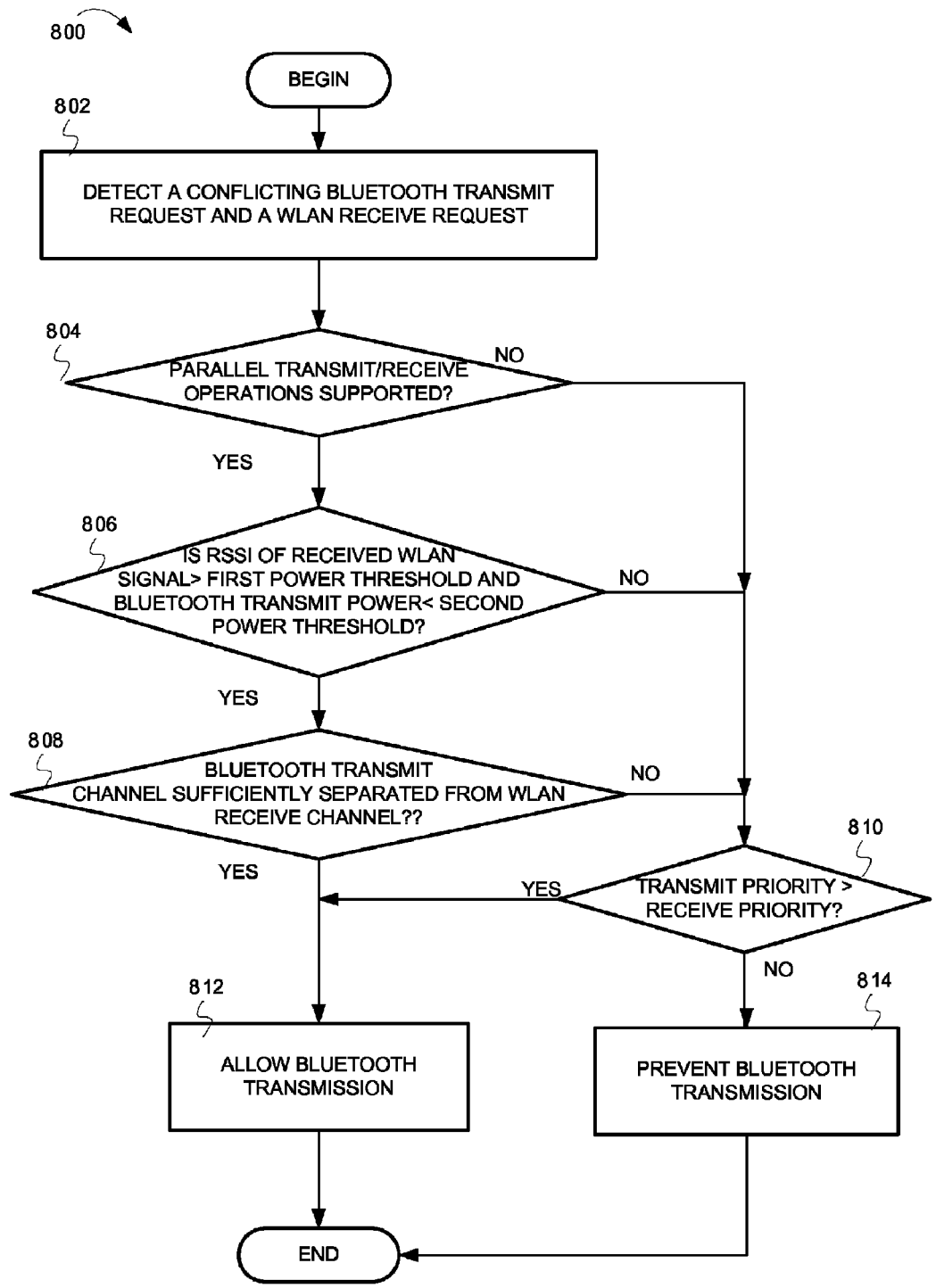
FIG. 8 is a flow diagram illustrating example operations for resolving conflicts between parallel transmit and receive requests.

FIG. 8 is a flow diagram illustrating example operations for resolving conflicts between parallel transmit and receive requests. Flow 800 begins at block 802.

At block 802, a conflicting Bluetooth transmit request and a WLAN receive request is detected. For example, the coexistence unit 112 of FIG. 1 may detect the conflicting Bluetooth transmit request and the WLAN receive request. The coexistence unit 112 may determine from a coexistence-scheduling table (e.g., the coexistence-scheduling table 120) that Bluetooth packets should be transmitted (e.g., based on a start time instant for the Bluetooth packet). In some implementations, the Bluetooth scheduler 108 may notify (via a coexistence interface) the coexistence unit 112 before the Bluetooth controller 106 starts transmitting Bluetooth packets. The coexistence unit 112 may detect the WLAN receive request by detecting a request-to-send signal. For example, the coexistence unit 112 may detect a frame detect signal or receive a notification of the frame detect signal from the WLAN processing unit 114. The flow continues at block 804.

At block 804, it is determined whether parallel transmit and receive operations may be supported. For example, the coexistence unit 112 may determine whether a host wireless device (e.g., the wireless device comprising the Bluetooth device 102 and the WLAN device 104) supports parallel transmit and receive operations. In one implementation, the host wireless device may comprise one antenna for transmitting Bluetooth or WLAN packets and a second antenna for receiving Bluetooth or WLAN packets. The coexistence unit 112 may allow parallel transmit and receive operations based on the design architecture of the wireless radio front end. If it is determined that parallel transmit and receive operations are supported, the flow continues at block 806. Otherwise, the flow continues at block 810.

At block 806, it is determined whether a signal strength of the received WLAN signal is greater than a first power threshold and the power required to transmit the Bluetooth packet ("Bluetooth transmit power") is less than a second power threshold. The coexistence unit 112 may calculate a received signal strength indicator (RSSI) of the received WLAN signal ("WLAN RSSI") as a measure of the WLAN signal strength. The coexistence unit 112 may also determine whether the WLAN RSSI is greater than the first power threshold and whether the Bluetooth transmit power is less than the second power threshold. In one implementation, the Bluetooth controller 106 may determine the Bluetooth transmit power and communicate the Bluetooth transmit power to the coexistence unit 112 via the coexistence interface. The WLAN processing unit 114 may determine the WLAN RSSI (e.g., from the RTS signal) and communicate the WLAN RSSI to the coexistence unit 112. The first power threshold and the second power threshold may be set so that if Bluetooth device is transmitting with a low powered signal and the WLAN device is receiving a strong signal, then simultaneous transmit and receive operations may be permitted. If it is determined that the WLAN RSSI is greater than the first power threshold and that the Bluetooth transmit power is less than a second power threshold, the flow continues at block 808. Otherwise, the flow continues at block 810.

At block 808, it is determined whether a communication channel to be used for Bluetooth packet transmission ("Bluetooth transmit channel") is sufficiently separated from a communication channel to be used for WLAN packet reception ("WLAN receive channel"). The Bluetooth controller 106 may communicate the Bluetooth transmit channel to the coexistence unit 112 via the coexistence interface. The WLAN processing unit 114 may communicate the WLAN receive channel to the coexistence unit 114. The coexistence unit 112 may compare the Bluetooth transmit channel and the WLAN receive channel and determine whether the separation between the two channels is larger than a pre-defined frequency separation. If it is determined that the Bluetooth transmit channel and the WLAN receive channel are sufficiently separated, the flow continues at block 812. Otherwise, the flow continues at block 810.

At block 810, it is determined whether a priority of the Bluetooth transmit request ("transmit priority") is greater than a priority of the WLAN receive request ("receive priority"). The transmit priority and the receive priority are compared if one of the conditions described with reference to blocks 804, 806, and 808 is not satisfied. In one implementation, the coexistence unit 112 may access the coexistence-scheduling table 120 and determine the Bluetooth transmit priority. The coexistence unit 112 may determine the WLAN receive priority based on packet content (e.g., whether the packet contains an ACK or an NACK, whether the packet is being retransmitted, etc.), a source of the WLAN packet (e.g., a peer WLAN device, an access point, etc.), link stability, signal strength, throughput, packet type, data rate, etc. On comparing the transmit priority and the receive priority, if the coexistence unit 112 determines that both the transmit priority and the receive priority are equal, the request with an earlier start time may be awarded priority. In another implementation, the coexistence unit 112 may allow the receive request but defer the transmit request if it both the transmit request and the receive request have the same priority.

In some implementations, the transmit priority and the receive priority may be user-determined or set by software.

Also, in some implementations, the priorities may be fixed, while in other implementations, the priorities may vary because of a variation in one or more of the factors influencing the priority (as mentioned above). If it is determined that the transmit priority is greater than the receive priority, the flow continues at block 812. Otherwise, the flow continues at block 814.

At block 812, Bluetooth transmission is allowed. For example, the coexistence unit 112 directs the Bluetooth controller 106 to transmit Bluetooth packets. If conditions described by blocks 804, 806, and 808 are satisfied and parallel transmit/receive operations are permitted, the coexistence unit 112 may also direct the WLAN processing unit 114 to receive WLAN packets. From block 812, the flow ends.

At block 814, Bluetooth transmission is prevented. Preference is given to the WLAN receive request if the priority of the WLAN receive request is greater than the priority of the Bluetooth transmit request. The coexistence unit 112 of FIG. 1 may direct the Bluetooth controller 106 to defer transmission of the Bluetooth packet. The coexistence unit 112 may also direct the Bluetooth scheduler 108 to reschedule the Bluetooth packet transmission. The Bluetooth scheduler 108 may reschedule the Bluetooth packet transmission and notify the coexistence unit 112 of the rescheduled Bluetooth transmission. In some implementations, the coexistence unit 112 may not interfere with WLAN packet reception. In other words, the WLAN receive request may always have higher priority than the Bluetooth transmit request. The coexistence unit 112 may direct the Bluetooth controller to defer transmission of the Bluetooth packet until the WLAN packet reception is completed. From block 814, the flow ends.

It should be noted that although FIG. 8 describes operations for resolving conflicts between a parallel Bluetooth transmit request and a WLAN receive request, the operations described with reference to FIG. 8 might also be used to resolve conflicts between parallel Bluetooth receive requests and WLAN transmit requests.

Figure 9:
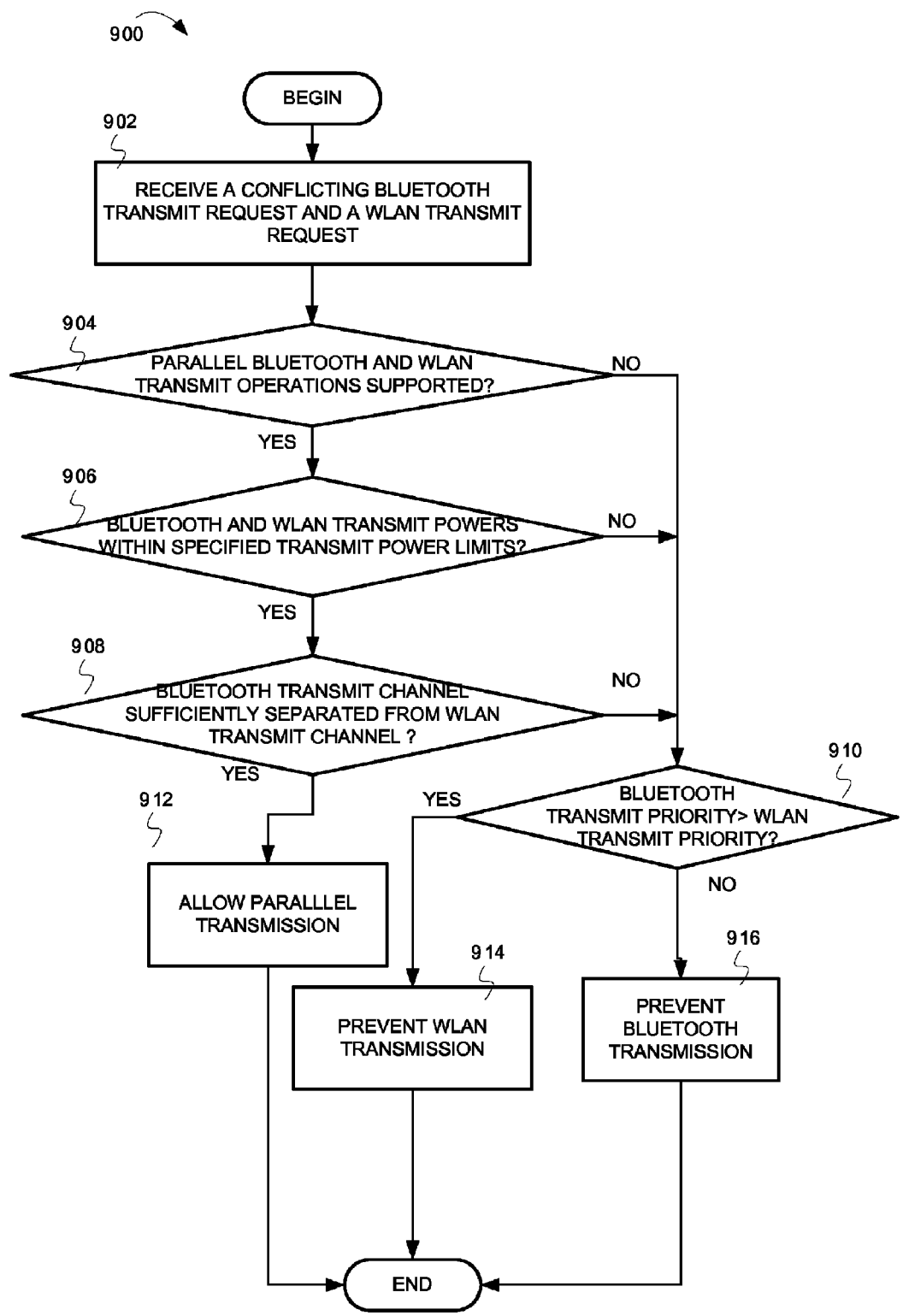
FIG. 9 is a flow diagram illustrating example operations for resolving conflicts between a WLAN transmit request and a Bluetooth transmit request.

FIG. 9 is a flow diagram illustrating example operations for resolving conflicts between a WLAN transmit request and a Bluetooth transmit request. Flow 900 begins at block 902.

At block 902, a conflicting Bluetooth transmit request and a WLAN transmit request are detected. For example, the coexistence unit 112 of FIG. 1 may detect the conflicting Bluetooth transmit request and the WLAN transmit request. The coexistence unit 112 may determine from a coexistence-scheduling table (e.g., the coexistence-scheduling table 120) that Bluetooth packets should be transmitted. The coexistence unit 112 may also receive a notification from a host wireless device indicating WLAN packets to be transmitted. Alternately, the coexistence unit 112 may query the WLAN processing unit 114 to determine whether there are WLAN packets (e.g., in a WLAN transmit queue) to be transmitted. The flow continues at block 904.

At block 904, it is determined whether parallel Bluetooth and WLAN transmit operations are supported. For example, the coexistence unit 112 may determine whether the host wireless device supports parallel Bluetooth and WLAN transmit operations. In one implementation, the Bluetooth device 102 and the WLAN device 104 may each have at least one antenna, which may respectively be used for Bluetooth and WLAN communications. In another implementation, the Bluetooth and the WLAN device may each have a dedicated transmit antenna. The coexistence unit 112 may allow parallel Bluetooth and WLAN transmit operations based on the design architecture of the wireless radio front end. If it is determined that parallel Bluetooth and WLAN transmit operations are supported, the flow continues at block 906. Otherwise, the flow continues at block 910.

At block 906, it is determined whether a Bluetooth transmit power and a WLAN transmit power are within specified transmit power limits. For example, the coexistence unit 112 may compare the Bluetooth and the WLAN transmit powers to determine whether the Bluetooth transmit power and the WLAN transmit power is within the specified transmit power limits. For example, parallel Bluetooth and WLAN transmit operations may be permitted if the Bluetooth transmit power is less than a first threshold value and the WLAN transmit power is less than a second threshold value. As another example, parallel Bluetooth and WLAN transmit operations may be permitted if the total transmit power (i.e., the Bluetooth and the WLAN transmit power) is less than a predefined threshold. As another example, parallel Bluetooth and WLAN transmit operations may be permitted if a difference between the Bluetooth and the WLAN transmit power is greater than a specified power separation. As another example, parallel Bluetooth and WLAN transmit operations may be permitted if the Bluetooth and the WLAN transmit power is similar when the Bluetooth and the WLAN devices use a common power amplifier. As another example, parallel Bluetooth and WLAN transmit operations may be permitted if the Bluetooth and the WLAN transmit powers are different when the Bluetooth and the WLAN devices use distinct power amplifiers. The coexistence unit 112 may receive an indication of the Bluetooth transmit power and the WLAN transmit power from the Bluetooth controller 106 and the WLAN processing unit 114 respectively. If it is determined that the Bluetooth and WLAN transmit powers are within the specified transmit power limits, the flow continues at block 908. Otherwise, the flow continues at block 910.

At block 908, it is determined a Bluetooth transmit channel is sufficiently separated from a WLAN transmit channel. The coexistence unit 112 may determine whether a frequency separation between the Bluetooth transmit channel and the WLAN transmit channel is greater than a threshold frequency interval. The Bluetooth controller 106 may communicate the Bluetooth transmit channel to the coexistence unit 112 via a coexistence interface. The WLAN processing unit 114 may also communicate the WLAN transmit channel to the coexistence unit 112. By comparing the Bluetooth transmit channel and the WLAN transmit channel, the coexistence unit 112 can also ensure that the Bluetooth transmit channel and the WLAN transmit channel do not overlap. If it is determined, that the Bluetooth transmit channel is sufficiently separated from the WLAN transmit channel, the flow continues at block 912. Otherwise, the flow continues at block 910.

At block 912, parallel Bluetooth packet transmission and WLAN packet transmission is allowed. The coexistence unit 112 may permit parallel Bluetooth and WLAN packet transmission only if the host wireless device supports parallel Bluetooth and WLAN transmit operations, the Bluetooth and the WLAN transmit powers are within the specified transmit power limits, and the Bluetooth and WLAN transmit channels are sufficiently separated. From block 912, the flow ends.

At block 910, it is determined whether a Bluetooth transmit priority is greater than a WLAN transmit priority. The coexistence unit 112 may compare the Bluetooth transmit priority and the WLAN transmit priority if one of the conditions described with reference to blocks 904, 906, and 908 is not satisfied. In one implementation, the coexistence unit 112 may access the coexistence-scheduling table 120 and determine the Bluetooth transmit priority. The coexistence unit 112 may determine the WLAN transmit priority based on packet content, packet destination, etc. If the coexistence unit 112 determines that the Bluetooth transmit priority and the WLAN transmit priority are equal, the transmit request with an earlier start time may be awarded priority. If it is determined that the Bluetooth transmit priority is greater than the WLAN transmit priority, the flow continues at block 914. Otherwise, the flow continues at block 916.

At block 914, the WLAN packet transmission is prevented. The coexistence unit 112 may direct the WLAN processing unit 114 to defer the WLAN packet transmission. In one implementation, the WLAN processing unit 114 may clear a WLAN aggregate and wait for an indication from the coexistence unit 112 before reforming the WLAN aggregate based on an available WLAN communication time interval. From block 914, the flow ends.

At block 916, the Bluetooth packet transmission is prevented. The coexistence unit 112 may direct the Bluetooth controller 106 to defer the Bluetooth packet transmission. The coexistence unit 112 may also direct the Bluetooth scheduler 108 to reschedule the Bluetooth packet transmission. The Bluetooth scheduler 108 may reschedule the Bluetooth packet transmission and notify the coexistence unit 112 of the rescheduled Bluetooth packet transmission. From block 916, the flow ends.

It should be understood that the depicted flow diagrams (FIGS. 3-6 and 8-9) and the timing diagrams (FIGS. 7A and 7B) are examples meant to aid in understanding embodiments and should not be used to limit embodiments or limit scope of the claims. Embodiments may perform additional operations, fewer operations, operations in a different order, operations in parallel, and some operations differently. For example, although FIG. 5 depicts that the flow 500 ends if it is determined that there are no WLAN packets to be transmitted (see block 504), in some implementations, a notification may be transmitted (e.g., by the coexistence unit 112) to the Bluetooth device 102 indicating that the communication medium is available for Bluetooth communications. In other implementations, it may be determined if the WLAN device 104 should listen on the communication medium for WLAN packets. The WLAN device 104 may not relinquish control of the communication medium until a start of a scheduled Bluetooth communication.

Also, although flow 800 describes operations for resolving conflicts between the conflicting Bluetooth transmit request and the WLAN receive request, flow 800 may also be used to resolve conflicts between a conflicting WLAN transmit request and a Bluetooth receive request. The coexistence unit 112 may receive a notification from a host device indicating WLAN packets to be transmitted. The coexistence unit 112 may also determine from the coexistence-scheduling table that Bluetooth packets are to be received. Parallel WLAN packet transmission and Bluetooth packet reception may be allowed if each of the evaluations at blocks 804, 806, 808, and 810 result in a "yes" path.

In some implementations, after the coexistence-scheduling table is populated, it may be analyzed (e.g., by the coexistence unit 112 or the Bluetooth scheduler 108 of FIG. 1) to determine whether there are conflicts between the Bluetooth communications. In conflict situations (e.g., when the Bluetooth communication start and end times overlap), various strategies may be implemented to resolve the conflict. In one implementation, the Bluetooth communication that was initiated first may take priority. In another implementation, receive communications may take priority over transmit communications. In another implementation, the Bluetooth communication with higher priority may be initiated while the conflicting Bluetooth communication with lower priority may be deferred.

Also, although the operations describe the coexistence unit 112 interrupting Bluetooth communications in favor of higher priority WLAN communications, in some implementations, the coexistence unit 112 can generate an interrupt to the WLAN device 104 (e.g., the WLAN processing unit 114) if a higher priority Bluetooth communication has not be completed (e.g., a Bluetooth packet has not be transmitted) or has been scheduled such that it overlaps with a low priority WLAN communication. In some implementations, the coexistence unit 112 may not interrupt a WLAN packet reception. Once the WLAN packet reception begins, the coexistence unit 112 can determine whether the ongoing WLAN packet reception has higher priority than a starting Bluetooth transmission and direct the Bluetooth scheduler 108 (e.g., by transmitting a message, by generating an interrupt) to suppress the Bluetooth transmission. The coexistence unit 112 can receive the WLAN packet header, determine the length of the WLAN packet being transmitted, and determine if the WLAN device 104 can transmit an acknowledgement for the packet before the Bluetooth device 102 starts receiving Bluetooth packets. The coexistence unit 112 can perform the same set of operations for rescheduling WLAN packet transmission in favor of ongoing Bluetooth packet reception.

It should be noted that although the flow diagrams describe the coexistence unit 112 waiting until ongoing Bluetooth transmission is completed before directing the WLAN processing unit 114 to initiate a WLAN communication, in some implementations, if it is determined that the WLAN communication has a higher priority than the ongoing Bluetooth transmission, the coexistence unit 112 may direct the Bluetooth scheduler 108 to abort the ongoing Bluetooth transmission in favor of the WLAN communication.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in a machine-readable signal medium, such as an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 10:
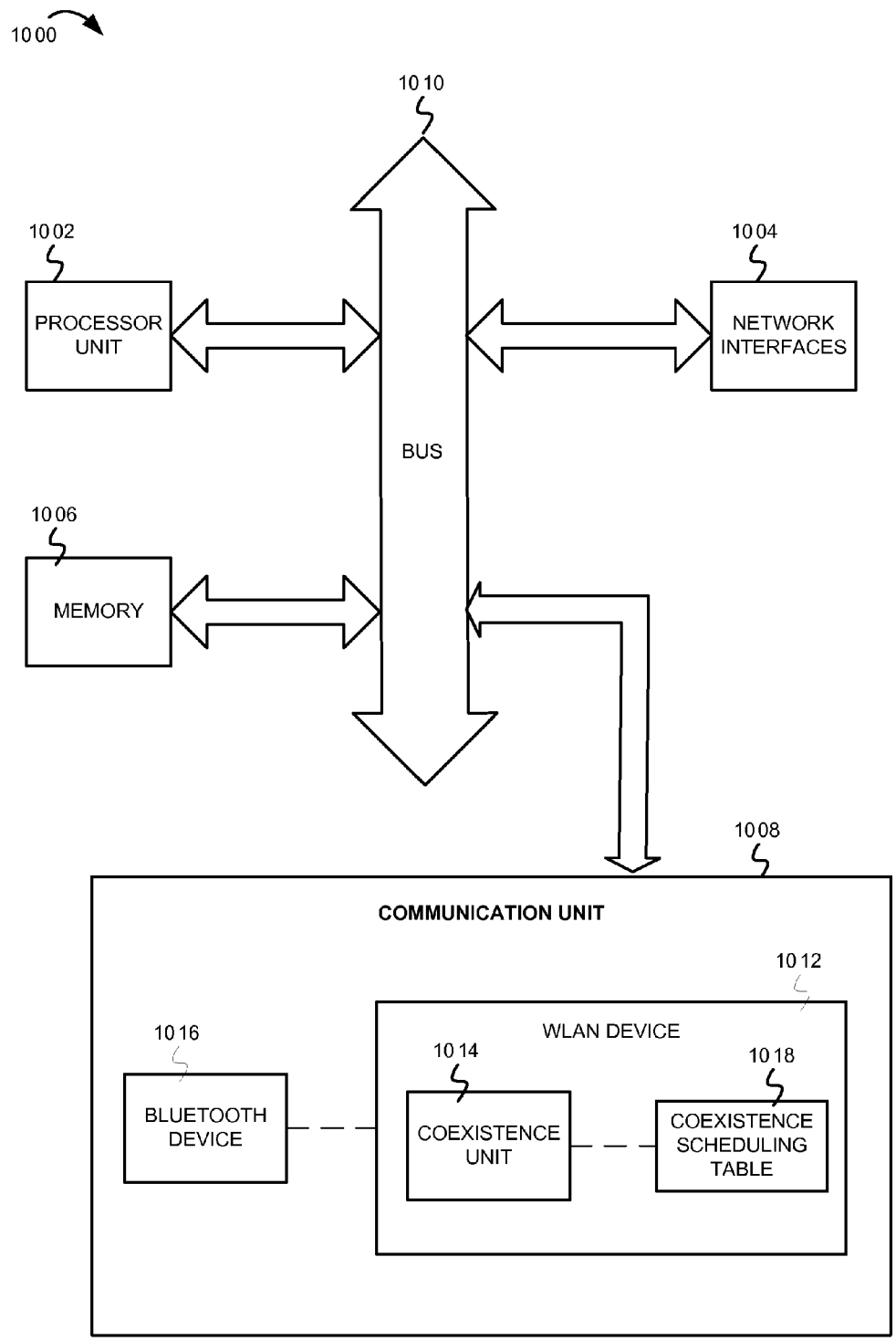
FIG. 10 is a block diagram of one embodiment of a computer system including a coexistence mechanism for Bluetooth and WLAN devices.

FIG. 10 is a block diagram of one embodiment of a computer system including a coexistence mechanism for Bluetooth and WLAN devices. In some implementations, the computer system 1000 may be one of a personal computer (PC), a laptop, a netbook, a mobile phone, a personal digital assistant (PDA), or other electronic systems comprising a collocated Bluetooth device and a WLAN device. The computer system 1000 includes a processor unit 1002 (possibly including multiple processors, multiple cores, multiple nodes, and/or implementing multi-threading, etc.). The computer system 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 1000 also includes a bus 1010 (e.g., PCI, ISA, PCI-Express, HyperTransport®, InfiniBand®, NuBus, etc.), and network interfaces 1004 that include at least one wireless network interface (e.g., a WLAN interface, a Bluetooth® interface, a WiMAX interface, a Zig-Bee® interface, a Wireless USB interface, etc.).

The computer system 1000 also includes a communication unit 1008. The communication unit 1008 comprises a Bluetooth device 1016 coupled with a WLAN device 1012. The Bluetooth device 1016 may be coupled to the WLAN device 1012 via a coexistence interface. The WLAN device 1012 comprises a coexistence unit 1014 and a coexistence-scheduling table 1018. The Bluetooth device 1016 may populate the coexistence-scheduling table 1018 based, in part, on information retrieved from received Bluetooth packets. The coexistence unit 1014 can retrieve Bluetooth transmit and receive schedules from the coexistence-scheduling table 1018 to schedule WLAN transmit/receive operations accordingly as described with reference to FIGS. 1-9. The coexistence unit 1014 can also determine and vary a WLAN aggregate size to schedule WLAN transmissions in between scheduled Bluetooth communications as described with reference to FIGS. 1-9.

While the embodiments are described with reference to various implementations and exploitations, it will be understood that these embodiments are illustrative and that the scope of the inventive subject matter is not limited to them. In general, techniques for enabling coexistence for an aggregation coexistence mechanism for wireless devices as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   detecting that a first wireless network device of a communication system comprises data to be transmitted;
   determining a communication schedule for a second wireless network device of the communication system;
   calculating a communication time interval for the first wireless network device based on the communication schedule for the second wireless network device;
   determining a number of data packets of the first wireless network device that can be transmitted during the communication time interval;
   generating an aggregate for the first wireless network device comprising the determined number of data packets that can be transmitted during the communication time interval;
   determining whether a start time instant of the communication time interval, at which the aggregate for the first wireless network device should be transmitted for successful transmission of the aggregate during the communication time interval, has expired, and whether transmission of the aggregate for the first wireless network device has been initiated; and
   modifying the communication time interval for the first wireless network device and the aggregate for the first wireless network device, if it is determined that the start time instant of the communication time interval has expired and transmission of the aggregate for the first wireless network device has not been initiated.

2. The method of claim 1, further comprising:
   maintaining the communication time interval for the first wireless network device and the aggregate for the first wireless network device, if it is determined that the start time instant of the communication time interval has expired and transmission of the aggregate for the first wireless network device has been initiated; and
   receiving an acknowledgment from the second wireless network device for the transmission of the aggregate during the communication time interval.

3. The method of claim 1, wherein said determining the number of data packets of the first wireless network device that can be transmitted during the communication time interval further comprises calculating the number of data packets of the first wireless network device that can be transmitted during the communication time interval such that the first wireless network device successfully receives an acknowledgement for the data packets without interfering with communications of the second wireless network device.

4. The method of claim 1, wherein said calculating the communication time interval for the first wireless network device comprises calculating a time interval between consecutive communications of the second wireless network device when the second wireless network device is inactive.

5. The method of claim 1, wherein said calculating the communication time interval for the first wireless network device comprises:
   determining, based on the communication schedule for the second wireless network device, that a priority of a next communication of the second wireless network device is less than a priority of the data of the first wireless network device to be transmitted; and
   calculating the communication time interval for the first wireless network device based, at least in part, on a time interval between a first communication and the next communication of the second wireless network device and a communication time of the next communication of the second wireless network device.

6. The method of claim 5, further comprising causing the second wireless network device to defer or to cancel the next communication of the second wireless network device.

7. The method of claim 5, wherein the priority of the data of the first wireless network device is based on at least one of the data of the first wireless network device, a source of the data, a destination of the data, stability of a communication link on which the data will be transmitted, a signal strength, throughput, and a data rate of the communication link.

8. The method of claim 1, wherein said calculating the communication time interval for the first wireless network device comprises:
   determining, based on the communication schedule for the second wireless network device, that a priority of a next communication of the second wireless network device is greater than a priority of the data of the first wireless network device to be transmitted;
   calculating the communication time interval for the first wireless network device based, at least in part, on a time interval between a first communication and the next communication of the second wireless network device, a communication time of the next communication of the second wireless network device, and determining whether the next communication of the second wireless network device is a transmit communication or a receive communication.

9. The method of claim 1, wherein the communication schedule indicates a communication of the second wireless network device and comprises at least one of a communication identifier, a start time for the communication, an end time for the communication, a communication link number, a priority of the communication, and an indication of whether the communication of the second wireless network device is a receive communication or a transmit communication.

10. The method of claim 1, wherein said modifying the communication time interval for the first wireless network device and the aggregate for the first wireless network device further comprises:
    determining a modified communication time interval for the first wireless network device;
    determining a second number of data packets of the first wireless network device that can be transmitted during the modified communication time interval; and
    modifying the aggregate for the first wireless network device so that the modified aggregate comprises the second number of data packets of the first wireless network device that can be transmitted during the modified communication time interval.

11. The method of claim 10, wherein said determining the modified communication time interval for the first wireless network device comprises:
    determining a time interval until a start of a communication of the second wireless network device having a priority that is greater than a priority of the data of the first wireless network device; and
    calculating the modified communication time interval for the first wireless network device based on the time interval until the start of the communication of the second wireless network device having a priority that is greater than the priority of the data of the first wireless network device.

12. The method of claim 1, wherein the first wireless network device is a wireless local area network (WLAN) device and the second wireless network device is a Bluetooth device.

13. A wireless local area networking (WLAN) device of a communication system comprising:
a processing unit operable to perform WLAN communication operations; and
a coexistence unit operable to:
detect that the WLAN device comprises data to be transmitted;
determine a communication schedule for a Bluetooth device, wherein the Bluetooth device is coupled to the WLAN device;
calculate a communication time interval for the WLAN device based on the communication schedule for the Bluetooth device;
determine a number of data packets of the WLAN device that can be transmitted during the communication time interval;
generate an aggregate for the WLAN device comprising the determined number of data packets that can be transmitted during the communication time interval;
determine that a start time instant of the communication time interval, at which the aggregate for the WLAN device should be transmitted for successful transmission of the aggregate during the communication time interval, has expired, and transmission of the aggregate for the WLAN device has not been initiated; and
modify the communication time interval for the WLAN device and the aggregate for the WLAN device.

14. The WLAN device of claim 13, wherein the coexistence unit being operable to calculate the communication time interval for the WLAN device further comprises the coexistence unit being operable to:
determine, based on the communication schedule for the Bluetooth device, that a priority of a next communication of the Bluetooth device is less than a priority of the data of the WLAN device to be transmitted; and
extend the communication time interval for the WLAN device based on a communication time of the next communication of the Bluetooth device.

15. The WLAN device of claim 14, wherein the coexistence unit is further operable to cause the Bluetooth device to defer or to cancel the next communication of the Bluetooth device.

16. The WLAN device of claim 13, wherein the communication schedule indicates a communication of the Bluetooth device and comprises at least one of a communication identifier, a start time for the communication, an end time for the communication, a communication link number, a priority of the communication, and an indication of whether the communication of the second wireless network device is a receive communication or a transmit communication.

17. The WLAN device of claim 13, wherein the coexistence unit being operable to modify the communication time interval for the WLAN device and the aggregate for the WLAN device further comprises the coexistence unit being operable to:
determine a modified communication time interval for the WLAN device;
determine a second number of data packets of the WLAN device that can be transmitted during the modified communication time interval; and
modify the aggregate for the WLAN device so that the modified aggregate comprises the second number of data packets of the WLAN device that can be transmitted during the modified communication time interval.

18. A method comprising:
receiving, at a WLAN device of a communication system, a communication schedule from a Bluetooth device of the communication system;
generating a coexistence-scheduling table for the Bluetooth device from the received communication schedule;
detecting that the WLAN device comprises data to be transmitted;
calculating a communication time interval for the WLAN device based on the coexistence-scheduling table for the Bluetooth device;
determining a number of data packets of the WLAN device that can be transmitted during the communication time interval;
generating an aggregate for the WLAN device comprising the determined number of data packets that can be transmitted during the communication time interval;
determining that a start time instant of the communication time interval, at which the aggregate for the WLAN device should be transmitted for successful transmission of the aggregate during the communication time interval, has expired, and transmission of the aggregate for the WLAN device has not been initiated; and
modifying the communication time interval for the WLAN device and the aggregate for the WLAN device.

19. The method of claim 18, wherein the coexistence-scheduling table indicates a communication of the Bluetooth device and comprises at least one of a communication identifier, a start time for the communication, an end time for the communication, a communication link number, a priority of the communication, and an indication of whether the communication of the second wireless network device is a receive communication or a transmit communication.

20. The method of claim 18, wherein the communication time interval for the WLAN device is a time interval between consecutive communications of the Bluetooth device when the Bluetooth device is inactive.

21. The method of claim 18, wherein said modifying the communication time interval for the WLAN device and the aggregate for the WLAN device further comprises:
determining a modified communication time interval for the WLAN device;
determining a second number of data packets of the WLAN device that can be transmitted during the modified communication time interval; and
modifying the aggregate for the WLAN device so that the modified aggregate comprises the second number of data packets of the WLAN device that can be transmitted during the modified communication time interval.

22. The method of claim 18, wherein the calculating the communication time interval for the WLAN device further comprises:
determining, based on the coexistence-scheduling table for the Bluetooth device, that a priority of a next communication of the Bluetooth device is less than a priority of the data of the WLAN device to be transmitted; and
extending the communication time interval for the WLAN device based on a communication time of the next communication of the Bluetooth device.

23. One or more non-transitory machine-readable storage media, having instructions stored therein, which when executed by of one or more processors causes the one or more processors to perform operations that comprise:

detecting that a WLAN of a communication system comprises data to be transmitted;

determining, a communication schedule for a Bluetooth device of the communication system;

calculating a communication time interval for the WLAN device based on the communication schedule for the Bluetooth device;

determining a number of data packets of the WLAN device that can be transmitted during the communication time interval;

generating an aggregate for the WLAN device comprising the determined number of data packets that can be transmitted during the communication time interval;

determining that a start time instant of the communication time interval, at which the aggregate for the WLAN device should be transmitted for successful transmission of the aggregate during the communication time interval, has expired, and transmission of the aggregate for the WLAN device has not been initiated; and modifying the communication time interval for the WLAN device and the aggregate for the WLAN device.

24. The non-transitory machine-readable storage media of claim 23, wherein said operation of calculating the communication time interval for the WLAN device further comprises:

determining, based on the communication schedule for the Bluetooth device, that a priority of a next communication of the Bluetooth device is less than a priority of the data of the WLAN device to be transmitted; and extending the communication time interval for the WLAN device based on a communication time of the next communication of the Bluetooth device.

25. The non-transitory machine-readable storage media of claim 23, wherein said operation of modifying the communication time interval for the WLAN device and the aggregate for the WLAN device further comprises:

determining a modified communication time interval for the WLAN device;

determining a second number of data packets of the WLAN device that can be transmitted during the modified communication time interval; and modifying the aggregate for the WLAN device so that the modified aggregate comprises the second number of data packets of the WLAN device that can be transmitted during the modified communication time interval.

\* \* \* \* \*